US008614265B2

(12) United States Patent
Hintzer et al.

(10) Patent No.: US 8,614,265 B2
(45) Date of Patent: Dec. 24, 2013

(54) METHOD OF MAKING FLUOROPOLYMER DISPERSION

(75) Inventors: Klaus Hintzer, Kastl (DE); Michael Jürgens, Neuoetting (DE); Harald Kaspar, Burgkirchen (DE); Herbert Koenigsmann, Burgkirchen (DE); Kai Helmut Lochhaas, Neuoetting (DE); Andreas R. Maurer, Langenneufnach (DE); Werner Schwertfeger, Altoetting (DE); Tilman Zipplies, Burghausen (DE); Ludwig Mayer, Burgkirchen (DE); Michael C. Dadalas, Eggenfelden (DE); George G. I. Moore, Afton, MN (US); Jay F. Schulz, Inver Grove Heights, MN (US); Richard M. Flynn, Mahtomedi, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 13/494,260

(22) Filed: Jun. 12, 2012

(65) Prior Publication Data
US 2012/0252949 A1 Oct. 4, 2012

Related U.S. Application Data

(60) Division of application No. 12/684,239, filed on Jan. 8, 2010, now Pat. No. 8,222,322, which is a continuation of application No. 11/420,386, filed on May 25, 2006, now Pat. No. 7,671,112.

(30) Foreign Application Priority Data

| Jul. 15, 2005 | (GB) | .................................... 0514387.0 |
| Jul. 15, 2005 | (GB) | .................................... 0514398.7 |
| Nov. 24, 2005 | (GB) | .................................... 0523853.0 |
| Dec. 21, 2005 | (GB) | .................................... 0525978.3 |

(51) Int. Cl.
*C08L 1/00* (2006.01)

(52) U.S. Cl.
USPC ........... 523/310; 523/332; 524/546; 524/558; 525/482; 525/544

(58) Field of Classification Search
USPC ........... 523/310, 332; 524/546, 558; 525/482, 525/544
See application file for complete search history.

(56) References Cited

U.S. PATENT DOCUMENTS

| 2,713,593 | A | | 7/1955 | Brice |
| 3,037,953 | A | | 6/1962 | Marks |
| 3,142,665 | A | | 7/1964 | Cardinal |
| 3,179,614 | A | | 4/1965 | Edwards |
| 3,260,691 | A | | 7/1966 | Lavin |
| 3,271,341 | A | * | 9/1966 | Garrison, Jr. ................. 524/777 |
| 3,315,201 | A | | 4/1967 | Werme |
| 3,345,317 | A | | 10/1967 | Hoashi |
| 3,391,099 | A | | 7/1968 | Punderson |
| 3,451,908 | A | | 6/1969 | Sianesi |
| 3,489,595 | A | | 1/1970 | Brown, Jr. |
| 3,555,100 | A | | 1/1971 | Garth |
| 3,635,926 | A | | 1/1972 | Gresham |
| 3,642,742 | A | | 2/1972 | Carlson |
| 3,721,696 | A | | 3/1973 | Sianesi |
| 3,790,403 | A | | 2/1974 | Ribbans, III |
| 3,855,191 | A | | 12/1974 | Doughty, Jr. |
| 3,882,153 | A | | 5/1975 | Seki |
| 3,981,945 | A | | 9/1976 | Attwood |
| 4,016,345 | A | | 4/1977 | Holmes |
| 4,025,709 | A | | 5/1977 | Blaise |
| 4,049,863 | A | | 9/1977 | Vassiliou |
| 4,123,401 | A | | 10/1978 | Berghmans |
| 4,131,711 | A | | 12/1978 | Attwood |
| 4,252,859 | A | | 2/1981 | Concannon |
| 4,262,101 | A | | 4/1981 | Hartwimmer |
| 4,282,162 | A | | 8/1981 | Kuhls |

(Continued)

FOREIGN PATENT DOCUMENTS

| CA | 2354138 | 6/2000 |
| DE | 3828063 | 2/1990 |

(Continued)

OTHER PUBLICATIONS

Apostolo et al., "Microemulsion Polymerization for Producing Fluorinated Structured Materials", Macromol. Symp. 2004, 206, pp. 347-360.

(Continued)

*Primary Examiner* — Peter D. Mulcahy
*Assistant Examiner* — Henry Hu
(74) *Attorney, Agent, or Firm* — Julie Lapos-Kuchar

(57) ABSTRACT

A method of making a fluoropolymer dispersion by first providing a fluoropolymer dispersion comprising fluoropolymer particles and one or more fluorinated surfactants selected from fluorinated carboxylic acids or salts thereof having the general formula:

$$[R_f\text{—O-L-COO}^-]_i X^{i+} \quad (I)$$

wherein L represents a linear fully fluorinated alkylene group, $R_f$ represents a linear fully fluorinated aliphatic group or a linear fully fluorinated aliphatic group interrupted with one oxygen atom, $X^{i+}$ represents a cation having the valence i and i is 1, 2 or 3;
then adding one or more non-fluorinated surfactants selected from anionic and non-ionic surfactants followed by reducing the total amount of the one or more fluorinated surfactants to an amount of not more than 500 ppm, for example not more than 250 ppm based on the total weight of the dispersion while maintaining or increasing the amount of solids in the dispersion.

20 Claims, No Drawings

(56) References Cited

U.S. PATENT DOCUMENTS

| | | |
|---|---|---|
| 4,287,112 A | 9/1981 | Berghmans |
| 4,292,402 A | 9/1981 | Pollet |
| 4,342,825 A | 8/1982 | Van Poucke |
| 4,353,950 A | 10/1982 | Vassiliou |
| 4,369,266 A | 1/1983 | Kuhls |
| 4,380,618 A | 4/1983 | Khan |
| 4,381,384 A | 4/1983 | Khan |
| 4,391,940 A | 7/1983 | Kuhls |
| 4,425,448 A | 1/1984 | Concannon |
| 4,439,385 A | 3/1984 | Kuhls |
| 4,544,458 A | 10/1985 | Grot |
| 4,548,986 A | 10/1985 | Suzuki |
| 4,552,925 A | 11/1985 | Nakagawa |
| 4,588,796 A | 5/1986 | Wheland |
| 4,618,641 A | 10/1986 | Hengel |
| 4,621,116 A | 11/1986 | Morgan |
| 4,623,487 A | 11/1986 | Cope |
| 4,766,190 A | 8/1988 | Morita |
| 4,789,717 A | 12/1988 | Giannetti |
| 4,832,879 A | 5/1989 | Hamprecht |
| 4,861,845 A | 8/1989 | Slocum |
| 4,864,006 A | 9/1989 | Giannetti |
| 4,987,254 A | 1/1991 | Schwertfeger |
| 5,075,397 A | 12/1991 | Tonelli |
| 5,153,322 A | 10/1992 | Flynn |
| 5,160,791 A | 11/1992 | Tannenbaum |
| 5,168,107 A | 12/1992 | Tannenbaum |
| 5,182,342 A | 1/1993 | Feiring |
| 5,198,491 A | 3/1993 | Honda |
| 5,219,910 A | 6/1993 | Stahl |
| 5,223,343 A | 6/1993 | Tannenbaum |
| 5,229,480 A | 7/1993 | Uschold |
| 5,230,961 A | 7/1993 | Tannenbaum |
| 5,272,186 A | 12/1993 | Jones |
| 5,285,002 A | 2/1994 | Grootaert |
| 5,312,935 A | 5/1994 | Mayer |
| 5,442,097 A | 8/1995 | Obermeier |
| 5,447,982 A | 9/1995 | Kamba |
| 5,453,477 A | 9/1995 | Oxenrider |
| 5,463,021 A | 10/1995 | Beyer |
| 5,478,651 A | 12/1995 | Tannenbaum |
| 5,488,142 A | 1/1996 | Fall |
| 5,498,680 A | 3/1996 | Abusleme |
| 5,530,078 A | 6/1996 | Felix |
| 5,532,310 A | 7/1996 | Grenfell |
| 5,562,991 A | 10/1996 | Tannenbaum |
| 5,576,381 A | 11/1996 | Bladel |
| 5,591,877 A | 1/1997 | Obermeier |
| 5,608,022 A | 3/1997 | Nakayama |
| 5,656,201 A | 8/1997 | Visca |
| 5,663,255 A | 9/1997 | Anolick |
| 5,667,846 A | 9/1997 | Thomas |
| 5,688,884 A | 11/1997 | Baker |
| 5,700,859 A | 12/1997 | Ogura |
| 5,710,345 A | 1/1998 | Navarrini |
| 5,721,053 A | 2/1998 | Thomas |
| 5,763,552 A | 6/1998 | Feiring |
| 5,789,083 A | 8/1998 | Thomas |
| 5,789,508 A | 8/1998 | Baker |
| 5,804,650 A | 9/1998 | Tsuda |
| 5,895,799 A | 4/1999 | Wu |
| 5,955,556 A | 9/1999 | Mccarthy |
| 5,959,026 A | 9/1999 | Abusleme |
| 5,969,063 A | 10/1999 | Parker |
| 5,990,330 A | 11/1999 | Sulzbach |
| 6,013,795 A | 1/2000 | Manzara |
| 6,025,307 A | 2/2000 | Chittofrati |
| 6,037,399 A | 3/2000 | Wu |
| 6,103,843 A | 8/2000 | Abusleme |
| 6,103,844 A | 8/2000 | Brothers |
| 6,126,849 A | 10/2000 | Yamana |
| 6,136,893 A | 10/2000 | Yamashita |
| 6,153,688 A | 11/2000 | Miura |
| 6,218,464 B1 | 4/2001 | Parker |
| 6,245,923 B1 | 6/2001 | Sulzbach |
| 6,255,384 B1 | 7/2001 | Mccarthy |
| 6,255,536 B1 | 7/2001 | Worm |
| 6,267,865 B1 | 7/2001 | Polson |
| 6,365,684 B1 | 4/2002 | Mccarthy |
| 6,376,710 B2 | 4/2002 | Matsumoto |
| 6,391,182 B2 | 5/2002 | Smeltzer |
| 6,395,848 B1 | 5/2002 | Morgan |
| 6,410,626 B1 | 6/2002 | Wada |
| 6,429,258 B1 | 8/2002 | Morgan |
| 6,436,244 B1 | 8/2002 | Fuhrer |
| 6,482,979 B1 | 11/2002 | Hintzer |
| 6,512,063 B2 | 1/2003 | Tang |
| 6,518,442 B1 | 2/2003 | Felix |
| 6,576,703 B2 | 6/2003 | Kapeliouchko |
| 6,593,416 B2 | 7/2003 | Grootaert |
| 6,602,968 B1 | 8/2003 | Bekiarian |
| 6,610,788 B1 | 8/2003 | Takakura |
| 6,613,941 B1 | 9/2003 | Felix |
| 6,624,268 B1 | 9/2003 | Maekawa |
| 6,632,508 B1 | 10/2003 | Pellerite |
| 6,642,307 B1 | 11/2003 | Sogabe |
| 6,642,415 B1 | 11/2003 | Fuhrer |
| 6,660,798 B1 | 12/2003 | Marchese |
| 6,677,414 B2 | 1/2004 | Hintzer |
| 6,689,854 B2 | 2/2004 | Fan |
| 6,693,152 B2 | 2/2004 | Kaspar |
| 6,703,520 B2 | 3/2004 | Hintzer |
| 6,706,193 B1 | 3/2004 | Burkard |
| 6,710,123 B1 | 3/2004 | Amin-Sanayei |
| 6,730,760 B2 | 5/2004 | Grootaert |
| 6,737,489 B2 | 5/2004 | Linert |
| 6,750,304 B2 | 6/2004 | Kaspar |
| 6,761,964 B2 | 7/2004 | Tannenbaum |
| 6,774,164 B2 | 8/2004 | Lyons |
| 6,794,550 B2 * | 9/2004 | Hintzer et al. ............... 570/178 |
| 6,815,040 B2 | 11/2004 | Pellerite |
| 6,822,059 B2 | 11/2004 | Buckanin |
| 6,825,250 B2 * | 11/2004 | Epsch et al. ............... 523/310 |
| 6,833,403 B1 * | 12/2004 | Bladel et al. ............... 524/458 |
| 6,846,570 B2 | 1/2005 | Leech |
| 6,861,466 B2 * | 3/2005 | Dadalas et al. ............... 524/544 |
| 6,861,490 B2 | 3/2005 | Kaspar |
| 6,869,997 B2 | 3/2005 | Wille et al. |
| 6,878,772 B2 | 4/2005 | Visca |
| 6,956,078 B2 | 10/2005 | Cavanaugh |
| 6,972,094 B2 | 12/2005 | Ichida |
| 7,026,036 B2 | 4/2006 | Leech |
| 7,041,728 B2 | 5/2006 | Zipplies |
| 7,045,571 B2 | 5/2006 | Tan |
| 7,064,170 B2 | 6/2006 | Kaspar |
| 7,074,862 B2 | 7/2006 | Kaspar |
| 7,122,608 B1 | 10/2006 | Brinati |
| 7,125,941 B2 | 10/2006 | Kaulbach |
| 7,126,016 B2 | 10/2006 | Fu |
| 7,141,620 B2 | 11/2006 | Hoshikawa |
| 7,262,246 B2 | 8/2007 | Tan |
| 7,279,522 B2 | 10/2007 | Dadalas |
| 7,297,744 B2 | 11/2007 | Kapeliouchko |
| 7,300,989 B2 | 11/2007 | Buckanin |
| 7,342,066 B2 | 3/2008 | Dadalas |
| 7,462,667 B2 | 12/2008 | Dadalas |
| 2002/0198345 A1 | 12/2002 | Grootaert |
| 2003/0125421 A1 | 7/2003 | Bladel |
| 2003/0153674 A1 * | 8/2003 | Visca et al. ............... 524/801 |
| 2004/0010156 A1 | 1/2004 | Kondo |
| 2004/0116742 A1 | 6/2004 | Guerra |
| 2004/0143052 A1 | 7/2004 | Epsch |
| 2004/0186219 A1 | 9/2004 | Dadalas |
| 2004/0242755 A1 | 12/2004 | Araki |
| 2005/0043471 A1 | 2/2005 | Epsch |
| 2005/0070633 A1 | 3/2005 | Epsch |
| 2005/0090601 A1 | 4/2005 | Dadalas |
| 2005/0090613 A1 | 4/2005 | Maruya |
| 2005/0107506 A1 * | 5/2005 | Kapeliouchko et al. ...... 524/379 |
| 2005/0113519 A1 | 5/2005 | Buckanin |
| 2005/0154104 A1 | 7/2005 | Malvasi |
| 2005/0228127 A1 | 10/2005 | Tatemoto |
| 2006/0003168 A1 | 1/2006 | Dadalas |
| 2006/0041051 A1 | 2/2006 | Nakatani |

(56) References Cited

U.S. PATENT DOCUMENTS

| | | |
|---|---|---|
| 2006/0160947 A1 | 7/2006 | Tan |
| 2006/0281946 A1 | 12/2006 | Morita |
| 2007/0015864 A1 | 1/2007 | Hintzer |
| 2007/0025902 A1 | 2/2007 | Hintzer |
| 2007/0082993 A1 | 4/2007 | Amin-Sanayei |
| 2007/0117915 A1 | 5/2007 | Funaki |
| 2007/0135558 A1 | 6/2007 | Tsuda et al. |
| 2007/0149733 A1 | 6/2007 | Otsuka |
| 2007/0155891 A1 | 7/2007 | Tsuda et al. |

FOREIGN PATENT DOCUMENTS

| | | |
|---|---|---|
| DE | 19932771 | 1/2001 |
| DE | 19933696 | 1/2001 |
| DE | 10018853 | 10/2001 |
| EP | 0014431 | 8/1980 |
| EP | 0015481 | 9/1980 |
| EP | 0022257 | 1/1981 |
| EP | 0222945 | 11/1984 |
| EP | 0219065 | 4/1987 |
| EP | 0524585 | 1/1993 |
| EP | 0525660 | 2/1993 |
| EP | 0612770 | 8/1994 |
| EP | 0625526 | 11/1994 |
| EP | 0632009 | 1/1995 |
| EP | 0649863 | 4/1995 |
| EP | 0712882 | 5/1996 |
| EP | 0718364 | 6/1996 |
| EP | 0739960 | 10/1996 |
| EP | 0752432 | 1/1997 |
| EP | 0816397 | 1/1998 |
| EP | 0818506 | 1/1998 |
| EP | 0890592 B1 | 1/1999 |
| EP | 0894541 | 2/1999 |
| EP | 0964009 | 12/1999 |
| EP | 0969027 | 1/2000 |
| EP | 1059333 | 12/2000 |
| EP | 1059342 | 12/2000 |
| EP | 1083441 | 3/2001 |
| EP | 1160258 | 12/2001 |
| EP | 1323677 | 7/2003 |
| EP | 1 334 996 | 8/2003 |
| EP | 1364972 | 11/2003 |
| EP | 1334996 A3 * | 3/2004 |
| EP | 1462461 | 9/2004 |
| EP | 1514848 | 4/2006 |
| GB | 642025 | 8/1950 |
| GB | 821353 | 10/1959 |
| GB | 966814 | 8/1964 |
| JP | 46011031 | 8/1966 |
| JP | 2000-128934 | 5/2000 |
| JP | 2002-179870 | 6/2002 |
| JP | 2002-308914 | 10/2002 |
| JP | 2002-317003 | 10/2002 |
| JP | 2003-043625 | 2/2003 |
| JP | 2003-119204 | 4/2003 |
| JP | 2003-212919 | 7/2003 |
| JP | 2004-358397 | 12/2004 |
| JP | 2004-359870 | 12/2004 |
| JP | 2005-008775 | 1/2005 |
| JP | 2005-0105045 | 4/2005 |
| RU | 2158274 | 10/2000 |
| WO | WO 94/14904 | 7/1994 |
| WO | WO 96/24622 | 8/1996 |
| WO | WO 97/17381 | 5/1997 |
| WO | WO 98/50603 | 11/1998 |
| WO | WO 00/22002 | 4/2000 |
| WO | WO 00/35971 | 6/2000 |
| WO | WO 00/52060 | 9/2000 |
| WO | WO 00/71590 | 11/2000 |
| WO | WO 01/46116 | 6/2001 |
| WO | WO 01/79332 | 10/2001 |
| WO | WO 02/14223 | 2/2002 |
| WO | WO 02/20676 | 3/2002 |
| WO | WO 02/078862 | 10/2002 |
| WO | WO 02/088203 | 11/2002 |
| WO | WO 02/088206 | 11/2002 |
| WO | WO 02/088207 | 11/2002 |
| WO | WO 02/095121 | 11/2002 |
| WO | WO 03/020836 | 3/2003 |
| WO | WO 03/051988 | 6/2003 |
| WO | WO 03/087176 | 10/2003 |
| WO | WO 03/087179 | 10/2003 |
| WO | WO 2004/031141 | 4/2004 |
| WO | WO 2004/067588 | 8/2004 |
| WO | WO 2005/003075 | 1/2005 |
| WO | WO 2005/042593 | 5/2005 |
| WO | WO 2005/056614 | 6/2005 |
| WO | WO 2005/063827 | 7/2005 |
| WO | WO 2005/065800 | 7/2005 |
| WO | WO 2005/082785 | 9/2005 |
| WO | WO 2005/121290 | 12/2005 |
| WO | WO 2006/011533 | 2/2006 |
| WO | WO 2006/020721 | 2/2006 |
| WO | WO 2007/120348 | 10/2007 |

OTHER PUBLICATIONS

Astm D 4895-04, "Standard Specification for Polytetrafluoroethylene (PTFE) Resin Produced From Dispersion", pp. 1-14.
Candau, "Inverse Emulsion and Microemulsion Polymerization", Emulsion Polymerization and Emulusion Polymers, John Wiley & Sons, 1997, Chapter 21.
Chi et al., "A Facile Synthesis of Partly-fluorinated Ethers Using Perfluoroporpoxyethylene and Aliphatic Alcohols", Bull. Korean Chem. Soc., 1999, vol. 20, No. 2, pp. 220-222.
Drobny, Technology of Fluoropolymers, CRC Press LLC, 2001, p. 35.
Ebnesajjad, "Fluoroplastics, vol. 2, Melt Processible Fluoropolymers", Plastics Design Library, NY, 2003, pp. 1-21.
Ebnesajjad, "Fluoroplastics, vol. 1, Non-Melt Processible Fluoroplastics", Plastics Design Library, NY, 2000, pp. 285-295.
England, "Catalytic Conversion of Fluoroalkyl Alkyl Ethers to Carbonyl Compounds", J. Org. Chem., 1984, vol. 49, pp. 4007-4008.
"Guide to Protein Purification, Methods in Enzymology," Deutscher, M. vol. 182, 24. 1990. (pp. 309-317).
"High Performance Polymers for Diverse Applications," Modern Fluoropolymers. Edited by John Scheirs. John Wiley & Sons, 1997.
"Hydrogen-Ion Activity to Laminated Materials, Glass," Encyclopedia of Chemical Technology. John Wiley & Sons, vol. 13, $3^{rd}$ Ed. 1981. (p. 687).
"Identification to Lignin," Encyclopedia of Polymer Science and Engineering. John Wiley & Sons, vol. 8. 1987 (p. 347).
"Immobilized Biocatalysts to Isoprene," Ullmann's Encyclopedia of Industrial Chemistry. vol. A14. 1985. (p. 439-459).
Ivanova et al., "Synthesis of Alcohols from Perfluorvinyl Esters", Zh. Vses. Khim Obsh 1999, (24), pp. 656-657.
Kokelenberg, H. and Pollet, R., "A New type fluortensides, based on the addition of nucleophiles to chlorotrifluoroethylene and hexafluoropropylene." Tenside Detergents, 1985, 22(1), pp. 22-27.
"Nonionic Surfactants." Edited by Martin J. Schick. 1967.
Storsberg, Joachim and Ritter, Helmut, "Cyclodextrins in Polymer Synthesis: A 'Green' Route to Fluorinated Polymers via Cyclodextrin Complexes in Aqueous Solution", *Macromol. Chem Phys.*, 2002, pp. 812-818.
Sudol et al., "Miniemulsion Polymerization", Emulsion Polymerization and Emulsion Polymers, John Wiley & Sons, 1997, Chapter. 20.
"Synthesis of Perfluoroalkyl Vinyl Ether Acids and Derivatives," Perfluoroalkyl Vinyl Ether Acids. Raymond Sullivan, vol. 34, No. 6, Jun. 1969. (p. 1841).
W.C. Griffin "Calculation of HLB Values of Non-Ionic Surfactants", Journal of Society of Cosmetic Chemists, vol. 5, (1954) p. 259.

* cited by examiner

METHOD OF MAKING FLUOROPOLYMER DISPERSION

CROSS-REFERENCE TO RELATED APPLICATION(S)

This application is a divisional application of pending prior application Ser. No. 12/684,239, filed Jan. 8, 2010, now U.S. Pat. No. 8,222,322; which is a continuation of application Ser. No. 11/420,386, filed May 25, 2006 and issued as U.S. Pat. No. 7,671,112; which claims priority to Great Britain Application No. 0525978.3, filed on Dec. 21, 2005; Great Britain Application No. 0523853.0, filed on Nov. 24, 2005; Great Britain Application No. 0514398.7, filed on Jul. 15, 2005; and Great Britain Application No. 0514387.0 filed on Jul. 15, 2005; all of which are herein incorporated by reference in their entirety.

The present invention relates to fluoropolymer dispersion and in particular to a method of making fluoropolymer dispersions.

Fluoropolymers, i.e. polymers having a fluorinated backbone, have been long known and have been used in a variety of applications because of several desirable properties such as heat resistance, chemical resistance, weatherability, UV-stability etc. . . . The various fluoropolymers are for example described in "Modern Fluoropolymers", edited by John Scheirs, Wiley Science 1997. The fluoropolymers may have a partially fluorinated backbone, generally at least 40% by weight fluorinated, or a fully fluorinated backbone. Particular examples of fluoropolymers include polytetrafluoroethylene (PTFE), copolymers of tetrafluoroethylene (TFE) and hexafluoropropylene (HFP) (FEP polymers), perfluoroalkoxy copolymers (PFA), ethylene-tetrafluoroethylene (ETFE) copolymers, terpolymers of tetrafluoroethylene, hexafluoropropylene and vinylidene fluoride (THV) and polyvinylidene fluoride polymers (PVDF).

The fluoropolymers may be used to coat substrates to provide desirable properties thereto such as for example chemical resistance, weatherability, water- and oil repellency, non-stick properties etc. For example aqueous dispersions of fluoropolymer may be used to coat kitchen ware, to impregnate fabric or textile e.g. glass fabrics, to coat paper or polymeric substrates.

A frequently used method for producing aqueous dispersions of fluoropolymers involves aqueous emulsion polymerization of one or more fluorinated monomers usually followed by an upconcentration step to increase the solids content of the raw dispersion obtained after the emulsion polymerization. The aqueous emulsion polymerization of fluorinated monomers generally involves the use of a fluorinated surfactant. Frequently used fluorinated surfactants include perfluorooctanoic acids and salts thereof, in particular ammonium perfluorooctanoic acid.

Recently, perfluoroalkanoic acids having 8 or more carbon atoms, have raised environmental concerns. For example, perfluoroalkanoic acids are not readily biodegradable and eliminate very slowly from the body of living organisms, i.e. they show bioaccumulation. Accordingly, measures have been taken to minimize the release of these compounds in the environment and hence methods have been developed to reduce the amount of these surfactants in aqueous dispersions and other fluoropolymer products.

U.S. Pat. No. 4,369,266 discloses a method whereby part of fluorinated surfactant is removed through ultrafiltration. WO 00/35971 further discloses a method in which the amount of fluorinated surfactant is reduced by contacting the fluoropolymer dispersion with an anion exchange resin. Other methods have been disclosed as well such as for example removal through steam distillation as disclosed in EP 1274771. A still further method involving decantation has been disclosed in EP 1 538 177.

Generally however, a small residual amount of the fluorinated surfactant may still remain in the aqueous dispersion with any of the methods described in the art. Depending on the effectiveness of the method, the amount may be only a few ppm or may be several hundred ppm. Hence, despite the reduced content of perfluoroalkanoic acid surfactant in fluoropolymer dispersion, it continues to be desirable to improve the environmental characteristics of these dispersions, particularly as they are used in preparing coatings on cookware. Moreover, the methods of reducing the content of perfluoroalkanoic acid surfactant disclosed in the art all have the disadvantage that operators of the process may be accidentally exposed to such compounds during the process and/or following work-up procedures. Still further, some further losses of the perfluorinated alkanoic acid surfactants in these processes cannot be avoided, which presents a further potential environmental disadvantage.

It would thus be desirable to find alternative fluorinated carboxylic acids that can be used in the emulsion polymerization of fluorinated monomers as fluorinated surfactants and that can be recovered from resulting aqueous dispersions using a convenient and cost effective method. Desirably, the alternative fluorinated carboxylic acids show lower bio-accumulation than perfluoro alkanoic acids having 8 or more carbon atoms, such that despite any remaining amount of the fluorinated carboxylic acid in the fluoropolymer dispersion, the dispersion will have less environmental impact. Likewise, because of the lower bio-accumulation of the alternative surfactants, the process of recovering them from fluoropolymer dispersion would be more advantageous from an environmental point of view.

In accordance with one aspect of the invention, there is provided a method of making a fluoropolymer dispersion, the method comprising:

(i) providing a fluoropolymer dispersion comprising fluoropolymer particles and one or more fluorinated surfactants selected from fluorinated carboxylic acids or salts thereof having the general formula:

$$[R_f\text{—O-L-COO}^-]_i X^{i+} \qquad (I)$$

wherein L represents a linear partially or fully fluorinated alkylene group or an aliphatic hydrocarbon group, $R_f$ represents a linear partially or fully fluorinated aliphatic group or a linear partially or fully fluorinated aliphatic group interrupted with one or more oxygen atoms, $X^{i+}$ represents a cation having the valence i and i is 1, 2 or 3;

(ii) adding one or more non-fluorinated surfactants selected from anionic and non-ionic surfactants; and (iii) reducing the total amount of said one or more fluorinated surfactants to an amount of not more than 500 ppm, for example not more than 250 ppm based on the total weight of the dispersion while maintaining or increasing the amount of solids in the dispersion.

It has been found that fluorinated carboxylic acids and salts according to the above general formula (I) eliminate more quickly from a living organism, as demonstrated on rat screening studies, than perfluoro alkanoic acids having 8 or more carbon atoms. Additionally, it has been found that these surfactants can be used in the emulsion polymerization of fluorinated monomers to produce fluoropolymer dispersions and can be recovered there from in an easy and convenient way. Because of their lower bio-accumulation, the fluorinated carboxylic acids, salts and derivatives (such as ester derivatives) should provide less of an environmental burden in case of small losses of these compounds. Also, the process of reducing the amount of these surfactants in the dispersion should be more beneficial for operators of the process that may be exposed, for example accidentally, to the fluorinated carboxylic acids, their salts or derivatives used in work-up procedures following the recovery from the dispersion.

In a particular further aspect, the invention also provides an aqueous fluoropolymer dispersion comprising (i) fluoropolymer particles in an amount of 30 to 70% by weight, (ii) fluorinated surfactant in an amount of more than 0 ppm but not more than 500 ppm, for example not more than 250 ppm, (iii) one or more non-ionic non-fluorinated surfactants and (iv) one or more anionic non-fluorinated surfactants, said fluorinated surfactant comprising one or more fluorinated carboxylic acids or salts thereof corresponding to the above general formula (I).

Fluorinated Carboxylic Acids and Salts Thereof

For the sake of convenience, the term 'fluorinated carboxylic acid' is hereinafter used to indicate the free acid as well as salts thereof. The fluorinated carboxylic acid used in the process of the invention corresponds to formula (I) above. Generally, the fluorinated carboxylic acid will be a low molecular weight compound, for example a compound having a molecular weight for the anion part of the compound of not more than 1000 g/mol, typically not more than 600 g/mol and in particular embodiments, the anion of the fluorinated carboxylic acid may have a molecular weight of not more than 500 g/mol.

Particularly preferred fluorinated carboxylic acids are those that when administered to rats show a recovery of at least 45%, for example at least 50% of the administered amount after 96 hours via renal elimination and that have a renal elimination half-life of not more than 35 hours, for example of not more than 30 hours in rats as tested according to the method set forth in the examples. Generally, fluorinated carboxylic acids in which each of the fluorinated aliphatic moieties in the compound have not more than 3 carbon atoms fulfill the aforementioned conditions of renal recovery and half-life. Thus, preferred compounds are those in which any fluorinated alkylene groups have not more than 3 carbon atoms and in which a fluorinated alkyl group of the compound has not more than 3 carbon atoms.

In the above formula (I), L represents a linking group. In one embodiment, the linking group can be a linear partially or fully fluorinated alkylene. Fully fluorinated alkylene groups include alkylene groups that consist of only carbon and fluorine atoms whereas partially fluorinated alkylene groups may additionally contain hydrogen. Generally, a partially fluorinated alkylene group should not contain more than 2 hydrogen atoms so as to be highly fluorinated and be non-telogenic or at least have minimal telogenic effects. Examples of fully fluorinated alkylene groups include linear perfluorinated alkylenes that have from 1 to 6 carbon atoms, for example linear perfluorinated alkylene groups of 1, 2, 3, 4 or 5 carbon atoms.

Examples of linear partially fluorinated alkylene groups include those that have from 1 to 6 carbon atoms. In a particular embodiment the linear partially fluorinated alkylene linking group has 1, 2, 3, 4, 5 or 6 carbon atoms and has only 1 or 2 hydrogen atoms. When the partially fluorinated alkylene group has 2 hydrogen atoms, they may be attached to the same carbon atom or they can be attached to different carbon atoms. When they are attached to different carbon atoms, such carbon atoms can be adjacent to each other or not. Also, in a particular embodiment, a carbon atom having 1 or 2 hydrogen atoms may be adjacent the ether oxygen atom to which the linking group is attached or adjacent the carboxylic group to which the linking group is attached at its other end.

In a further embodiment, the linking group L is an aliphatic hydrocarbon group. Examples of aliphatic hydrocarbon groups include linear, branched or cyclic aliphatic groups. Particular examples of aliphatic groups include linear or branched alkylene groups of 1 to 4 carbon atoms such as for example methylene or ethylene.

Particular examples of linking groups L may be selected from the following:
—$(CF_2)_g$— wherein g is 1, 2, 3, 4, 5 or 6;
—CFH—$(CF_2)_h$— wherein h is 0, 1, 2, 3, 4 or 5;
—$CF_2$—CFH—$(CF_2)_d$— wherein d is 0, 1, 2, 3 or 4;
—$CH_2$—$(CF_2)_h$— wherein h is 1, 2, 3 or 4;
—$(CH_2)_c$— wherein c is 1, 2, 3 or 4;

In the above examples, the left side of the formula of the linking group is the site where the linking group is connected to the ether oxygen in formula (I).

The $R_f$ group in formula (I) represents a linear partially or fully fluorinated aliphatic group or a linear partially or fully fluorinated aliphatic group interrupted with one or more oxygen atoms. In one embodiment, $R_f$ is a linear perfluorinated aliphatic group having 1 to 6 carbon atoms, preferably having 1, 2, 3 or 4 carbon atoms. According to another embodiment $R_f$ is a linear perfluorinated aliphatic group interrupted with one or more oxygen atoms of which the alkylene groups between oxygen atoms have not more than 4 or 6 carbon atoms, for example 3 or less carbon atoms and wherein the terminal alkyl group has not more than 4 or 6 carbon atoms, for example 3 or less carbon atoms. According to a still further embodiment, $R_f$ is a linear partially fluorinated aliphatic group having 1 to 6 carbon atoms and not more than 2 hydrogen atoms or a linear partially fluorinated aliphatic group interrupted with one or more oxygen atoms and which has not more than 2 hydrogen atoms. In the latter embodiment, it will generally be preferred that any perfluorinated alkylene moiety has not more than 4 or 6 carbon atoms and any terminal perfluorinated alkyl group, likewise preferably should not have more than 6 carbon atoms, for example not more than 4 carbon atoms. A particular example of a partially fluorinated aliphatic group $R_f$ is
$CF_3CFH$—.

In a particular embodiment, $R_f$ may correspond to the following formula:

$$R_f^1—[OR_f^2]_p-[OR_f^3]_q \quad \text{(II)}$$

wherein $R_f^1$ is a perfluorinated linear aliphatic group of 1 to 6 carbon atoms (for example 3 or less), $R_f^2$ and $R_f^3$ each independently represents a linear perfluorinated alkylene of 1, 2, 3 or 4 carbon atoms and p and q each independently represent a value of 0 to 4 and wherein the sum of p and q is at least 1.

In another embodiment, $R_f$ may correspond to the following formula:

$$R^7_f—(O)_t—CFH—CF_2— \quad \text{(III)}$$

wherein t is 0 or 1 and $R^7_f$ represents a linear partially or fully fluorinated aliphatic group optionally interrupted with one or more oxygen atoms. Typically $R^7_f$ does not contain perfluorinated aliphatic moieties of more than 4 or 6 carbon atoms. For example, in one embodiment, $R^7_f$ is a perfluorinated linear aliphatic group of 1 to 6 carbon atoms. In another embodiment, $R^7_f$ is a group corresponding to above formula (II).

In yet a further embodiment, $R_f$ may correspond to the following formula:

$$R_f^8—(OCF_2)_a— \quad \text{(IV)}$$

wherein a is an integer of 1 to 6 and $R_f^8$ is a linear partially fluorinated aliphatic group or a linear fully fluorinated aliphatic group having 1, 2, 3 or 4 carbon atoms. When $R_f^8$ is a partially fluorinated aliphatic group, the number of carbon atoms preferably is between 1 and 6 and the number of hydrogen atoms in the partially fluorinated aliphatic groups is preferably 1 or 2.

In a still further embodiment, $R_f$ may correspond to the following formula:

$$R_f^9-O-(CF_2)_b-\quad\quad\quad(V)$$

wherein b is an integer of 1 to 6, preferably 1, 2, 3 or 4 and $R_f^9$ is a linear partially fluorinated aliphatic group or a linear fully fluorinated aliphatic group having 1, 2, 3 or 4 carbon atoms. When $R_f^9$ is a partially fluorinated aliphatic group, the number of carbon atoms preferably is between 1 and 6 and the number of hydrogen atoms in the partially fluorinated groups is preferably 1 or 2.

In a particular embodiment of the present invention, the fluorinated carboxylic acid corresponds to the following formula:

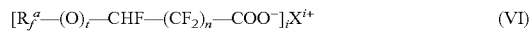

$$[R_f^a-(O)_t-CHF-(CF_2)_n-COO^-]_iX^{i+}\quad\quad(VI)$$

wherein $R_f^a$ represents a linear partially or fully fluorinated aliphatic group optionally interrupted with one or more oxygen atoms, t is 0 or 1 and n is 0 or 1, $X^{i+}$ represents a cation having a valence i and i is 1, 2 or 3, with the proviso that when t is 0, the $R_f^a$ contains at least one ether oxygen atom.

In a particular aspect of this embodiment, the $R_f^a$ is selected from the group consisting of linear perfluorinated aliphatic groups of 1 to 6 carbon atoms, preferably having 1 to 4 carbon atoms, perfluorinated groups of the formula $R_f^1-[OR_f^2]_p-[OR_f^3]_q-$ wherein $R_f^1$ is a linear perfluorinated aliphatic group of 1 to 6 carbon atoms, preferably 1 to 4 carbon atoms, $R_f^2$ and $R_f^3$ each independently represents a linear perfluorinated alkylene of 1, 2, 3 or 4 carbon atoms and p and q each independently represent a value of 0 to 4 and wherein the sum of p and q is at least 1 and perfluorinated groups of the formula $R_f^4-[OR_f^5]_k-[OR_f^6]_m-O-CF_2-$ wherein $R_f^4$ is a linear perfluorinated aliphatic group of 1 to 6 carbon atoms, preferably 1 to 4 carbon atoms, $R_f^5$ and $R_f^6$ each independently represents a linear perfluorinated alkylene of 1, 2, 3 or 4 carbon atoms and k and m each independently represent a value of 0 to 4.

Fluorinated carboxylic acid of formula (VI) can be derived from fluorinated olefins of the general formula:

$$R_f^a-(O)_t-CF=CF_2\quad\quad\quad(VIa)$$

wherein $R^a_f$ and t are as defined above. Compounds according to formula (VIa) are well known in the art and include fluorinated olefins such as perfluorinated alkyl vinyl compounds, vinyl ethers in particular perfluorovinyl ethers and allyl ethers, in particular perfluorinated allyl ethers.

Fluorinated carboxylic acids according to formula (VI) wherein n is 0 can be prepared by reacting a fluorinated olefin of formula (VIa) with a base. The reaction is generally carried out in aqueous media. An organic solvent may be added to improve the solubility of the fluorinated olefin. Examples of organic solvents include glyme, tetrahydrofuran (THF) and acetonitrile. Additionally or alternatively a phase transfer catalyst may be used. As a base, use can be made of for example ammonia, alkali and earth alkali hydroxides. Without intending to be bound by any theory, it is believed, that the reaction proceeds according to the following sequence when ammonia is used as a base:

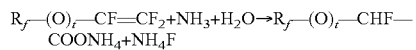

$$R_f-(O)_t-CF=CF_2+NH_3+H_2O\rightarrow R_f-(O)_t-CHF-COONH_4+NH_4F$$

The reaction is generally carried out between 0 and 200° C., for example between 20-150° C. and at a pressure between about 1 bar up to about 20 bar. For further purification, the obtained salts can be distilled via the free acid or by first converting the acid into an ester derivative and then distilling the ester derivative followed by hydrolysis of the ester to obtain the purified acid or salt thereof.

Fluorinated carboxylic acids of formula (VI) wherein n is 0 can also be prepared by reacting a fluorinated olefin of formula (VIa) with a hydrocarbon alcohol in an alkaline medium and then decomposing the resulting ether in acidic conditions thereby forming the corresponding carboxylic acid. Suitable hydrocarbon alcohols include aliphatic alcohols such as lower alkanols having 1 to 4 carbon atoms. Specific examples include methanol, ethanol and butanol including t-butanol. The reaction of the fluorinated olefin with the alcohol in an alkaline medium may be carried out as described in "Furin et al., Bull Korean Chem. Soc. 20, 220 [1999]". The reaction product of this reaction is an ether derivative of the fluorinated olefin. This resulting ether can be decomposed under acidic conditions as described in "D. C. England, J. Org. Chem. 49, 4007 (1984)" to yield the corresponding carboxylic acid or salt thereof.

To prepare fluorinated carboxylic acids of formula (VI) wherein n is 1, a free radical reaction of the fluorinated olefin of formula (VIa) with methanol may be carried out followed by an oxidation of the resulting reaction product. The free radical reaction is typically carried out using a free radical initiator as is typically used in a free radical polymerization reaction. Examples of suitable free radical initiators include persulfates such as for example ammonium persulfate. Detailed conditions of the free radical reaction of the fluorinated carboxylic acid with an alcohol can be found in "S. V. Sokolov et al., Zh. Vses. Khim Obsh 24, 656 (1979)". The resulting alcohol derivative of the fluorinated olefin can be chemically oxidized with an oxidizing agent to the corresponding carboxylic acid. Examples of oxidizing agents include for example potassium permanganate, chromium (VI) oxide, $RuO_4$ or $OsO_4$ optionally in the presence of NaOCl, nitric acid/iron catalyst, dinitrogen tetroxide. Typically the oxidation is carried out in acidic or basic conditions at a temperature between 10 and 100° C. In addition to chemical oxidation, electrochemical oxidation may be used as well.

In another embodiment, the fluorinated carboxylic acid corresponds to the following formula:

$$R_f^b-(O)_t-CFH-CF_2-O-R-G\quad\quad(VII)$$

wherein $R_f^b$ represents a linear partially or fully fluorinated aliphatic group optionally interrupted with one or more oxygen atoms, R is an aliphatic hydrocarbon group, G represents a carboxylic acid or salt thereof, t is 0 or 1. Particular examples for R include a methylene group or an ethylene group.

In a particular aspect of this embodiment, the $R_f^b$ is selected from the group consisting of linear perfluorinated aliphatic groups of 1 to 6 carbon atoms, preferably having 1 to 4 carbon atoms, perfluorinated groups of the formula $R_f^1-[OR_f^2]_p[OR_f^3]_q-$ wherein $R_f^1$ is a linear perfluorinated aliphatic group of 1 to 6 carbon atoms, preferably 1 to 4 carbon atoms, $R_f^2$ and $R_f^3$ each independently represents a linear perfluorinated alkylene of 1, 2, 3 or 4 carbon atoms and p and q each independently represent a value of 0 to 4 and wherein the sum of p and q is at least 1 and perfluorinated groups of the formula $R_f^4-[OR_f^5]_k-[OR_f^6]_m-O-CF_2-$ wherein $R_f^4$ is a linear perfluorinated aliphatic group of 1 to 6 carbon atoms, preferably 1 to 4 carbon atoms, $R_f^5$ and $R_f^6$ each independently represents a linear perfluorinated alkylene of 1, 2, 3 or 4 carbon atoms and k and m each independently represent a value of 0 to 4.

Fluorinated carboxylic acids according to formula (VII) may be prepared through the preparation of an intermediate of formula (VIIa):

$$R_f^b-(O)_t-CFH-CF_2-O-R-Z$$

wherein $R_f^b$, t and R have the same meaning as defined above. Z represents a carboxylic acid ester or a carboxylamide.

The intermediate compound according to formula (VIIa) can be prepared by reacting a fluorinated olefin of the general formula (VIa) with an organic compound of the formula $$HO-R-Z \quad (VIIb)$$

wherein Z and R are as defined above. Compounds according to formula (VIIb) are well known in the art and/or are commercially available. The reaction of compound (VIa) with compound (VIIb) is typically carried out in the presence of a base although it is also possible to carry out the reaction under acidic or neutral conditions. Suitable bases include carbonates such as potassium carbonate, sodium carbonate and lithium carbonate, hydroxides, alkoholates etc. The amount of base used may vary widely. For example a catalytic amount may be used. Generally the amount of base used will be about at least 1 or 2% by weight based on the amount of reactant of formula (VIIb). In a particular embodiment, the amount of base can be up to 2 times the molar amount of the reactant of formula (VIIb). The reaction is typically carried out in an aprotic solvent such as for example, tetrahydrofuran, acetonitrile, glyme, diglyme etc. Further suitable aprotic solvents are disclosed in DE 3828063. The reaction is typically carried out a temperature between 0 and 200° C., for example between 10 and 150° C. The reaction is generally carried out at an ambient pressure (1 bar) or up to 20 bar. Following the reaction, the resulting compound may be isolated and purified by distillation.

The fluorinated carboxylic acids of formula (VII) can be readily prepared by hydrolyzing the intermediate compound of formula (VIIa) above. In formula (VIIa) above, Z represents a carboxylic acid ester or a carboxylamide. Typically a carboxylic acid ester is used. In one embodiment, the ester can be an aliphatic ester, e.g. an alkyl ester in which the number of carbon atoms in the alkyl group are from 1 to 4. Hydrolysis of the intermediate compound may be carried out under acidic or basic conditions and is generally carried out in an alcoholic acidic or basic solution of the intermediate compound. Alternatively the intermediate compound may be hydrolysed in an acidic or basic solution of other water miscible organic solvents such as ketones, ethers etc. Typically, a basic alcoholic solution is used such as for example a methanol or ethanol solution containing an alkali metal hydroxide as the base. Typically the hydrolysis is carried out at room temperature but it is also possible to use elevated temperatures of for example up to the boiling point of the solution.

Alternatively, the fluorinated surfactant may be prepared by reacting the fluorinated olefin of formula (VIa) above with a hydroxy substituted carboxylic acid or salt thereof. Thus, in accordance with this embodiment the fluorinated olefin of formula (VIa) is reacted with a compound of the formula:

$$HO-R-G \quad (VIIc)$$

wherein G is a carboxylic acid group or salt thereof and R is as defined above. The reaction of a fluorinated olefin of formula (VIa) with a hydroxy compound or formula (VIIc) can be carried out under the same conditions described above for the reaction with compounds of formula (VIIb).

In a still further embodiment, the fluorinated carboxylic acid corresponds to one of the following formulas:

$$R_f^c-(OCF_2)_u-O-(CF_2)_v-AC \quad (VIII)$$

wherein u is an integer of 1 to 6, v is an integer of 1 to 6, $R_f^c$ represents a linear perfluorinated aliphatic group of 1, 2, 3 or 4 carbon atoms and AC represents a carboxylic acid group or salt thereof; and $$R_f^c-O-(CF_2)_y-O-L^1-AC \quad (IX)$$

wherein y has a value of 1, 2, 3, 4, 5 or 6, $L^1$ represents a linear perfluorinated alkylene of 1, 2, 3, 4, 5 or 6 carbon atoms or a linear partially fluorinated alkylene having 1 to 6 carbon atoms and 1 or 2 hydrogen atoms, $R_f^c$ is as defined in above formula (VIII) and AC represents a carboxylic acid group or salt thereof. A particular example for $L^1$ includes a group of the formula —CFH—. Particular compounds according to formula (IX) include those wherein $R_f^c$ represents $CF_3CFH$—. Such groups can be obtained from decarboxylation of —$CF(CF_3)COOX$ groups (X is a cation) in the presence of a protic substance as described in JOC 34, 1841 (1969).

Fluorinated carboxylic acids of formula (VIII) are commercially available from Anles Ltd., St. Petersburg, Russia. These compounds may be prepared for example as described by Ershov and Popova in Fluorine Notes 4(11), 2002. Also, these fluorinated carboxylic acids typically form as byproducts in the manufacturing of hexafluoropropylene oxide by direct oxidation of hexafluoropropylene.

Fluorinated carboxylic acids according to formula (IX) can be derived from reactants that are also used in the manufacturing of fluorinated vinyl ethers as described in U.S. Pat. No. 6,255,536.

In another embodiment acid fluorides of formula (X) are reacted with a metal fluoride like KF or CsF:

$$R_f^g-COF \quad (X)$$

wherein $R_f^g$ is a partially or perfluorinated linear aliphatic chain optionally interrupted with one or more oxygen atoms. This reaction results in an alkoxylate that can be further reacted with a carboxylic acid derivative of formula (XI)

$$Y-(CH_2)_n-Q \quad (XI)$$

wherein Y represents a leaving group like iodide, bromide, chloride, mesylate, tosylate and the like, n is an integer from 1 to 3, and Q represents a carboxyl acid group or a lower alkyl ester. The reaction results in fluorinated carboxylic acid derivatives of formula (XII)

$$R_f^g-CF_2-O-(CH_2)_nQ \quad (XII)$$

with $R_f^g$ n, and Q having the same meaning as above. The corresponding salts can be obtained by saponification.

In yet a further embodiment the fluorinated carboxylic acids correspond to formula (XIII)

$$CF_3-CF_2-O-R_f^h-COOX \quad (XIII)$$

with $R_f^h$ representing a linear partially or fully fluorinated linear carbon chain of 1 to 8 carbon atoms optionally interrupted with one or more oxygen atoms, for example a perfluorinated linear aliphatic group of 1 to 6 carbon atoms, for example 1, 2, 3 or 4 carbon atoms and X is a monovalent cation. Compounds of this formula can be made by conversion of diacid difluorides of formula (XIV) in the presence of e.g. antimony pentafluoride.

$$FOC-CF(CF_3)-O-R_f^h-COF \quad (XIV)$$

This conversion may be carried out at elevated temperature according to the method described in U.S. Pat. No. 3,555,100 resulting preferably in the decarbonylation of the secondary COF group. The resulting mono acid fluoride can be converted to the corresponding salt using well known methods.

Fluorinated carboxylic acids having a —O—CF$_2$—COOX group can be obtained from the corresponding vinyl ethers —O—CF═CF$_2$. Reaction of the vinyl ether with oxygen according to U.S. Pat. No. 4,987,254 results in acid fluorides carrying a —O—CF$_2$COF group which can be readily converted to the corresponding acid or salt.

Specific examples of compounds according to formula (I) include the following:

R$_f$—O—CHF—COOH
C$_3$F$_7$—O—CHF—COOH
CF$_3$—O—CF$_2$CF$_2$—CF$_2$—O—CHF—COOH
CF$_3$CF$_2$CF$_2$—O—CF$_2$CF$_2$—CF$_2$—O—CHF—COOH
CF$_3$—O—CF$_2$—CF$_2$—O—CHF—COOH
CF$_3$—O—CF$_2$—O—CF$_2$—CF$_2$—O—CHF—COOH
CF$_3$—(O—CF$_2$)$_2$—O—CF$_2$—CF$_2$—O—CHF—COOH
CF$_3$—(O—CF$_2$)$_3$—O—CF$_2$—CF$_2$—O—CHF—COOH
R$_f$—O—CHF—CF$_2$—COOH
CF$_3$—O—CHF—CF$_2$—COOH
CF$_3$—O—CF$_2$—CF$_2$—O—CHF—CF$_2$—COOH
CF$_3$—CF$_2$—O—CHF—CF$_2$—COOH
CF$_3$—O—CF$_2$—CF$_2$—CF$_2$—O—CHF—CF$_2$—COOH
CF$_3$—O—CF$_2$—O—CF$_2$—CF$_2$—O—CHF—CF$_2$—COOH
CF$_3$—(O—CF$_2$)$_2$—O—CF$_2$—CF$_2$—O—CHF—CF$_2$—COOH
CF$_3$—(O—CF$_2$)$_3$—O—CF$_2$—CF$_2$—O—CHF—CF$_2$—COOH
R$_f$—O—CF$_2$—CHFCOOH
CF$_3$—O—CF$_2$—CHF—COOH
C$_3$F$_7$—O—CF$_2$—CHF—COOH
CF$_3$—O—CF$_2$—CF$_2$—CF$_2$—O—CF$_2$—CHF—COOH
CF$_3$—O—CF$_2$—O—CF$_2$—CF$_2$—O—CF$_2$—CHF—COOH
CF$_3$—(O—CF$_2$)$_2$—O—CF$_2$—CF$_2$—O—CF$_2$—CHF—COOH
CF$_3$—(O—CF$_2$)$_3$—O—CF$_2$—CF$_2$—O—CF$_2$—CHF—COOH
R$_f$—O—CF$_2$—CHF—CF$_2$COOH
CF$_3$—O—CF$_2$—CHF—CF$_2$—COOH
C$_2$F$_5$—O—CF$_2$—CHF—CF$_2$—COOH
C$_3$F$_7$—O—CF$_2$—CHF—CF$_2$—COOH
CF$_3$—O—CF$_2$—CF$_2$—CF$_2$—O—CF$_2$—CHF—CF$_2$—COOH
CF$_3$—O—CF$_2$—O—CF$_2$—CF$_2$—O—CF$_2$—CHF—CF$_2$—COOH
CF$_3$—(O—CF$_2$)$_2$—O—CF$_2$—CF$_2$—O—CF$_2$—CHF—CF$_2$—COOH
CF$_3$—(O—CF$_2$)$_3$—O—CF$_2$—CF$_2$—O—CF$_2$—CHF—CF$_2$—COOH
R$_f$—(O)$_m$—CHF—CF$_2$—O—(CH$_2$)$_n$—COOH n=1, 2 or 3; m=0 or 1
CF$_3$—O—CHF—CF$_2$—O—CH$_2$—COOH
CF$_3$—O—CF$_2$—CF$_2$—CF$_2$—O—CHF—CF$_2$—O—CH$_2$—COOH
C$_3$F$_7$—O—CHF—CF$_2$—O—CH$_2$—COOH
C$_3$F$_7$—O—CHF—CF$_2$—O—CH$_2$—CH$_2$—COOH
C$_3$F$_7$—O—CF$_2$—CF$_2$—O—CHF—CF$_2$—OCH$_2$COOH
C$_3$F$_7$—O—CF$_2$—CF$_2$—CF$_2$—O—CHF—CF$_2$—OCH$_2$COOH
C$_3$F$_7$—O—CF$_2$—CHF—CF$_2$—OCH$_2$COOH
CF$_3$—CHF—CF$_2$—O—CH$_2$COOH
C$_3$F$_7$—CF$_2$—CHF—CF$_2$—OCH$_2$COOH
CF$_3$—O—CF$_2$—CF$_2$—O—CH$_2$—COOH
CF$_3$—O—CF$_2$—CF$_2$—CF$_2$—O—CF$_2$—CF$_2$—O—CH$_2$—COOH
C$_3$F$_7$—O—CF$_2$—CF$_2$—O—CH$_2$—COOH
C$_3$F$_7$—O—CF$_2$—CF$_2$—O—CH$_2$—CH$_2$—COOH
C$_3$F$_7$—O—CF$_2$—CF$_2$—O—CF$_2$—CF$_2$—OCH$_2$COOH
C$_3$F$_7$—O—CF$_2$—CF$_2$—CF$_2$—O—CF$_2$—CF$_2$—OCH$_2$COOH
C$_3$F$_7$—O—CF$_2$—CF$_2$—CF$_2$—OCH$_2$COOH
C$_4$F$_9$—O—CH$_2$—COOH
C$_4$F$_9$—O—CH$_2$—CH$_2$—COOH
C$_3$F$_7$—O—CH$_2$COOH
C$_6$F$_{13}$—OCH$_2$—COOH
R$_f$—O—CF$_2$—CF$_2$—COOH
CF$_3$—O—CF$_2$—CF$_2$—COOH
C$_2$F$_5$—O—CF$_2$—CF$_2$—COOH
C$_3$F$_7$—O—CF$_2$—CF$_2$—COOH
C$_4$F$_9$—O—CF$_2$—CF$_2$—COOH
R$_f$—(O—CF$_2$)$_u$—O—CF$_2$—COOH with u being as Defined Above
CF$_3$—(O—CF$_2$)$_3$—O—CF$_2$—COOH
CF$_3$—(O—CF$_2$)$_2$—O—CF$_2$—COOH
CF$_3$—(O—CF$_2$)$_1$—O—CF$_2$—COOH
R$_f$—(O—CF$_2$—CF$_2$)$_k$—O—CF$_2$—COOH with k being 1, 2 or 3
CF$_3$—(O—CF$_2$—CF$_2$)$_1$—O—CF$_2$—COOH
C$_2$F$_5$—(O—CF$_2$—CF$_2$)$_1$—O—CF$_2$—COOH
C$_3$F$_7$—(O—CF$_2$—CF$_2$)$_1$—O—CF$_2$—COOH
C$_4$F$_9$—(O—CF$_2$—CF$_2$)$_1$—O—CF$_2$—COOH
C$_2$F$_5$—(O—CF$_2$—CF$_2$)$_2$—O—CF$_2$—COOH
CF$_3$—(O—CF$_2$—CF$_2$)$_2$—O—CF$_2$—COOH
C$_3$F$_7$—(O—CF$_2$—CF$_2$)$_2$—O—CF$_2$—COOH
C$_4$F$_9$—(O—CF$_2$—CF$_2$)$_2$—O—CF$_2$—COOH
R$_f$—O—CF$_2$—COOH
C$_3$F$_7$—O—CF$_2$—COOH
CF$_3$—O—CF$_2$—CF$_2$—CF$_2$—O—CF$_2$—COOH
CF$_3$—CHF—O—(CF$_2$)$_n$—COOH with o being an Integer of 1, 2, 3, 4, 5 or 6
CF$_3$CFH—O—(CF$_2$)$_3$—COOH
CF$_3$CFH—O—(CF$_2$)$_5$—COOH
CF$_3$—CF$_2$—O—(CF$_2$)$_n$—COOH with o being as Above
CF$_3$—CF$_2$—O—(CF$_2$)$_3$COOH
CF$_3$—CF$_2$—O—(CF$_2$)$_5$COOH In the above generic formulas, R$_f$ has the meaning as defined above in respect of generic formula (I). It is understood that while the above list of compounds only lists the acids, the corresponding salts, in particular the NH$_4^+$, potassium, sodium or lithium salts can equally be used.

Non-Ionic Non-Fluorinated Surfactants

Suitable non-fluorinated non-ionic surfactants include those described in "Nonionic Surfactants", M. J. Schick (ed.), Marcel Dekker, Inc., New York 1967. Examples of non-ionic surfactants can be selected from the group of alkylarylpolyethoxy alcohols, polyoxyalkylene alkyl ether surfactants, polysorbates and alkoxylated acetylenic diols, preferably ethoxylated acetylenic diols and mixtures of such surfactants. Preferably, the non-ionic surfactant or non-ionic surfactant mixture used will have an HLB (hydrophilic lypophilic balance) between 11 and 16. The HLB number was introduced by W. C. Griffin "Calculation of HLB Values of Non-Ionic Surfactants," *Journal of the Society of Cosmetic Chemists* 5 (1954), p. 259 to characterize surfactants. The HLB number of non-ionic surfactants having only ethyleneoxide groups can be calculated according to the formula HLB=E/5 where E represents the weight % of ethyleneoxide groups. In case of a mixture of surfactants, the HLB value can be calculated according to the formula:

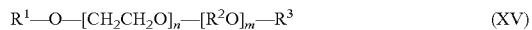

wherein $HLB_i$ represents the HLB of surfactant i and $w_i$ represents the weight fraction of surfactant i in the surfactant mixture and n represents the number of different surfactants making up the surfactant mixture.

In one embodiment, the non-ionic surfactant or mixture of non-ionic surfactants corresponds to the general formula:

$$R^1\text{—}O\text{—}[CH_2CH_2O]_n\text{—}[R^2O]_m\text{—}R^3 \qquad (XV)$$

wherein $R^1$ represents a linear or branched aliphatic or aromatic hydrocarbon group having at least 8 carbon atoms, preferably 8 to 18 carbon atoms, $R^2$ represents an alkylene having 3 carbon atoms, $R^3$ represents hydrogen or a $C_1$-$C_3$ alkyl group, n has a value of 0 to 40, m has a value of 0 to 40 and the sum of n+m is at least 2. When the above general formula represents a mixture, n and m will represent the average amount of the respective groups. Also, when the above formula represents a mixture, the indicated amount of carbon atoms in the aliphatic group $R^1$ may be an average number representing the average length of the hydrocarbon group in the surfactant mixture. Commercially available non-ionic surfactant or mixtures of non-ionic surfactants include those available from Clariant GmbH under the brand GENAPOL™ such as GENAPOL™ X-080, a surfactant according to the above formula (XV) in which m is 0 and GENAPOL™ PF 40 a surfactant in which both n and m are non-zero. Further suitable non-ionic surfactants that are commercially available include Tergitol™ TMN 6 or Tergitol™ TMN 100X, Tergitol™ TMN 10, and Triton® X-100.

According to a further embodiment, a mixture of one or more surfactants according to formula (XV) in which m is 0 with one or more surfactants according to formula (XV) with n and m each being non-zero can be used. An example of such a mixture is a mixture of GENAPOL™ X-080 and GENAPOL™ PF40.

In a still further embodiment, one or more polysorbates may be used optionally in combination with one or more surfactants according to formula (XV). Polysorbates are ethoxylated sorbitan fatty esters and are well known as emulsifiers. Useful polysorbates include polysorbate 20, polysorbate 40, polysorbate 60 and polysorbate 80. The structure of polysorbate 80 is disclosed in e.g. EP 1452571.

Polysorbate 20, 40 and 60 have a very similar structure as polysorbate 80. Polysorbate 20, is a laurate ester of sorbitol and its anhydrides having approximately twenty moles of ethylene oxide for each mole of sorbitol and sorbitol anhydrides. Polysorbate 40 is a palmitate ester of sorbitol and its anhydrides having approximately twenty moles of ethylene oxide for each mole of sorbitol and sorbitol anhydrides. Polysorbate 60 is a mixture of stearate and palmitate esters of sorbitol and its anhydrides having approximately twenty moles of ethylene oxide for each mole of sorbitol and sorbitol anhydrides.

Further non-ionic surfactants that can be used include alkoxylated acetylenic diols, for example ethoxylated acetylenic diols. The ethoxylated acetylenic diols for use in this embodiment preferably have a HLB between 11 and 16. Commercially available ethoxylated acetylenic diols that may be used include those available under the SURFYNOL brand from Air Products, in particular SURFYNOL™ 465. Still further useful non-ionic surfactants include polysiloxane based surfactants such as Silwet® L77 commercially available from Crompton Corp.

Anionic Non-Fluorinated Surfactants

Anionic non-fluorinated surfactants that may be used in connection with this invention include surfactants that have an acid group, in particular a sulfonic or carboxylic acid group. Examples of non-fluorinated anionic surfactants include surfactants that have one or more anionic groups. Anionic non-fluorinated surfactants may include in addition to one or more anionic groups also other hydrophilic groups such as polyoxyalkylene groups having 2 to 4 carbons in the oxyalkylene group, such as polyoxyethylene groups. Typical non-fluorinated surfactants include anionic hydrocarbon surfactants. The term "anionic hydrocarbon surfactants" as used herein comprises surfactants that comprise one or more hydrocarbon moieties in the molecule and one or more anionic groups, in particular acid groups such as sulfonic, sulfuric, phosphoric and carboxylic acid groups and salts thereof. Examples of hydrocarbon moieties of the anionic hydrocarbon surfactants include saturated and unsaturated aliphatic groups having for example 6 to 40 carbon atoms, preferably 8 to 20 carbon atoms. Such aliphatic groups may be linear or branched and may contain cyclic structures. The hydrocarbon moiety may also be aromatic or contain aromatic groups. Additionally, the hydrocarbon moiety may contain one or more hetero atoms such as for example oxygen, nitrogen and sulfur.

Particular examples of anionic hydrocarbon surfactants for use in this invention include alkyl sulfonates such as lauryl sulfonate, alkyl sulfates such as lauryl sulfate, alkylarylsulfonates and alkylarylsulfates, fatty (carboxylic) acids and salts thereof such as lauric acids and salts thereof and phosphoric acid alkyl or alkylaryl esters and salts thereof. Commercially available anionic hydrocarbon surfactants that can be used include Polystep™ A16 (sodium dodecylbenzyl sulphonate) from Stepan Company, Hostapur™ SAS 30 (secondary alkyl sulphonate sodium salt), Emulsogen™ LS (sodium lauryl sulfate) and Emulsogen™ EPA 1954 (mixture of $C_{12}$ to $C_{14}$ sodium alkyl sulfates) available from Clariant GmbH, Edenor C-12 (Laurie acid) available from Cognis and TRITON™ X-200 (sodium alkylsulfonate) available from Union Carbide. Further suitable anionic surfactants include the sulfosuccinates disclosed in EP 1538177 and EP 1526142. Preferred are anionic hydrocarbon surfactants having a carboxylic acid group.

In a particular embodiment in connection with the present invention, a combination of non-ionic surfactants and anionic hydrocarbon surfactants is selected such that the Viscosity Transition Temperature (VTT) of the dispersion is at least 26° C., preferably at least 28° C. Suitable mixtures to achieve a VTT of at least 26° C. have been disclosed in EP 1452571.

Reducing the Amount of Fluorinated Surfactant in the Fluoropolymer Dispersion

In accordance with the method of the invention, the amount of fluorinated surfactant is reduced to a level of not more than 500 ppm or more than 250 ppm while maintaining or increasing the amount of solids in the dispersion. To avoid coagulation of the dispersion while reducing the amount of fluorinated surfactant, a non-ionic and/or anionic non-fluorinated surfactant is added to the dispersion. Depending on the particular method for reducing the fluorinated surfactant, a non-ionic and/or anionic surfactant can be used as the stabilizing surfactant. Generally, a non-ionic surfactant can be used in any of the methods of reducing the amount of fluorinated surfactant in the dispersion whereas the utility of anionic surfactants is more limited.

The removal of fluorinated surfactant is preferably carried out using crude or raw dispersions directly from the polymerization of fluorinated monomers. Crude dispersions typically have a solids content of 10 to 40% by weight. Nonionic and/or anionic emulsifiers are typically added to the crude dispersions in amount sufficient to provide a desired dispersion stability after reduction of the fluorinated surfactant. An amount from 0.5 to 20% by weight, preferably from 1 to 12% by weight of non-ionic/anionic emulsifier is generally sufficient for this purpose. Although reducing the amount of fluorinated surfactant in the crude dispersion is generally preferred, it is also possible to reduce the amount of fluorinated surfactant while upconcentrating the dispersion or after upconcentration of the dispersion. If an upconcentrated dispersion is used, the amount of solids may be between 40 and 70% by weight, for example between 45 and 65% by weight. Hence, the fluorinated surfactant may be reduced in dispersions having a solids content of 10 to 70% by weight, for example between 15 and 65% by weight.

Suitable methods for reducing the fluorinated surfactant content in the dispersion include contacting the aqueous dispersion with an anion exchange resin, ultrafiltration as disclosed in e.g. U.S. Pat. No. 4,369,266, a method involving decantation as disclosed in EP 1 538 177 and a method involving steam distilling the free acid form of the fluorinated surfactant as disclosed in EP 1274771.

In one particular embodiment for reducing the amount of fluorinated surfactant, a non-ionic non-fluorinated surfactant is added to the aqueous dispersion and the so obtained dispersion is contacted with an anion exchange resin. In a particular embodiment, the anion exchange process is carried out in essentially basic conditions. Accordingly, the ion exchange resin will preferably be in the OH⁻ form although anions like fluoride or oxalate corresponding to weak acids may be used as well. The specific basicity of the ion exchange resin is not very critical. Strongly basic resins are preferred because of their higher efficiency in removing the low molecular weight fluorinated surfactant. The process may be carried out by feeding the fluoropolymer dispersion through a column that contains the ion exchange resin or alternatively, the fluoropolymer dispersion may be stirred with the ion exchange resin and the fluoropolymer dispersion may thereafter be isolated by filtration. With this method, the amount of fluorinated surfactant can be reduced to levels below 150 ppm or even below 10 ppm. Accordingly, dispersions substantially free of fluorinated surfactant may thereby be obtained. Additionally, the anion exchange resin will typically also remove other low molecular weight fluorinated substances that have an anionic group.

In another embodiment, the amount of fluorinated surfactant may be reduced by ultrafiltration. The method of ultrafiltration comprises the steps of (a) adding non-ionic and/or anionic non-fluorinated surfactant to a dispersion and (b) circulating the dispersion over a semi-permeable ultra-filtration membrane to separate the dispersion into a fluorinated polymer dispersion and an aqueous permeate. The circulation is typically at a conveying rate of 2 to 7 meters per second and affected by pumps, which keep the fluorinated polymer free from contact with components which cause frictional forces. The method of ultrafiltration further has the advantage that during ultrafiltration the amount of fluorinated surfactant can be reduced while at the same time increasing the solids in the dispersion, i.e. upconcentrating the dispersion. If the ultrafiltration is to be used solely for reducing the level of fluorinated surfactant in the dispersion without increasing the amount of solids, water may be added to the dispersion during the ultrafiltration in amounts so as to maintain the amount of solids in the dispersion constant.

In a still further embodiment, the amount of fluorinated surfactant may be reduced in the dispersion through distillation of the free acid form of the surfactant. This process can be used if the surfactant in its free acid form is steam volatile, which is typically the case for the fluorinated carboxylic acids of formula (I). Typically, this method involves adding a non-ionic and/or anionic emulsifier to the aqueous fluoropolymer dispersion and removing steam-volatile fluorinated emulsifier by distillation until the concentration of steam-volatile fluorinated emulsifier in the dispersion reaches the desired value. Generally, the method is practiced at a low pH, for example a pH of 5 or less. The low pH can be produced by adding customary strong mineral acids, such as HCl, $H_2SO_4$, $HClO_4$, or $HNO_3$. $HNO_3$ is preferred, since the $NH_4NO_3$ that may be formed in a subsequent neutralization of the dispersion with $NH_3$ is noncorrosive, has adequate volatility and does not interfere with the sintering of the fluoropolymer. A cation-exchange process, as described in U.S. Pat. No. 5,463,021 for example, is also suitable for setting the desired pH and for preparing particularly pure dispersions.

Further methods that can be used to reduce the amount of fluorinated carboxylic acid in the dispersion include decantation methods as disclosed in for example EP 1538177 and EP 1526142. If desired, the conductivity of the dispersion may be adjusted subsequent to the reduction of the amount of fluorinated carboxylic acid. Generally, the conductivity of the dispersion should be at least 50 µS/cm, usually 100 µS/cm or higher, limited by the viscosity of the dispersion.

Fluoropolymer Dispersions

The fluoropolymer contained in the fluoropolymer dispersion is a polymer that has a partially or fully fluorinated backbone. Typically the fluoropolymer is a polymer that has a backbone that is at least 40% by weight fluorinated, preferably at least 50% by weight, more preferably at least 60% by weight. The fluoropolymer may also have a fully fluorinated backbone such as for example in PTFE. The fluoropolymer contained in the aqueous dispersion includes melt-processible as well as non-melt processible fluoropolymers. By the term melt-processible is meant a fluoropolymer that has a melt flow index (MFI) sufficiently large such that the polymer can be processed with available polymer melt processing equipment. Examples of non-melt processible fluoropolymers include polytetrafluoroethylene (PTFE) and so-called modified PTFE, which is a polymer of tetrafluoroethylene modified with minor amounts, e.g. 1% or less, of another fluorinated monomer such as for example a perfluorinated vinyl ether. Melt-processible fluoropolymers include the so-called fluorothermoplasts and fluoropolymers for the preparation of fluoroelastomers. Fluorothermoplasts typically have a well defined and pronounced melting point. Typically, the melting point of a fluorothermoplast will be at least 60° C. with a preferred range being between 100° C. and 320° C. The fluoropolymer of the fluoropolymer dispersion may also be a polymer that upon curing results in a fluoroelastomer. Typically, such fluoropolymers are amorphous fluoropolymers that have no melting point or that have a hardly noticeable melting point. Still further, the fluoropolymer may comprise so-called micro-powder, which is typically a low molecular weight polytetrafluoroethylene. Due to the low molecular weight of the PTFE, micro-powders are melt processible.

The fluoropolymer dispersions for use in this invention may be produced by aqueous emulsion polymerization of one or more fluorinated monomers using one or more fluorinated carboxylic acids according to formula (I) as emulsifiers or fluorinated surfactants. Typically the amount of fluorinated surfactant used will be between 0.001 and 1% by weight. Examples of fluorinated monomers that may be polymerized with the fluorinated carboxylic acids of formula (I) include partially or fully fluorinated gaseous monomers including fluorinated olefins such as tetrafluoroethylene, chlorotrifluoroethylene, hexafluoropropylene, vinyl fluoride, vinylidene fluoride, partially or fully fluorinated allyl ethers and partially or fully fluorinated vinyl ethers. The polymerization may further involve non-fluorinated monomers such as ethylene and propylene.

Further examples of fluorinated monomers that may be used in the aqueous emulsion polymerization according to the invention include those corresponding to the formula:

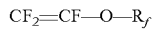
$$CF_2=CF-O-R_f$$

wherein $R_f$ represents a perfluorinated aliphatic group that may contain one or more oxygen atoms. Preferably, the perfluorovinyl ethers correspond to the general formula:

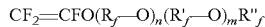
$$CF_2=CFO(R_f-O)_n(R'_f-O)_mR''_f$$

wherein $R_f$ and $R'_f$ are different linear or branched perfluoroalkylene groups of 2-6 carbon atoms, m and n are independently 0-10, and $R''_f$ is a perfluoroalkyl group of 1-6 carbon atoms. Examples of perfluorovinyl ethers according to the above formulas include perfluoro-2-propoxypropylvinyl ether (PPVE-2), perfluoro-3-methoxy-n-propylvinyl ether, perfluoro-2-methoxy-ethylvinyl ether, perfluoromethylvinyl ether (PMVE), perfluoro-n-propylvinyl ether (PPVE-1) and

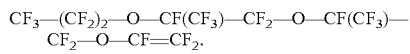
$$CF_3-(CF_2)_2-O-CF(CF_3)-CF_2-O-CF(CF_3)-CF_2-O-CF=CF_2.$$

Still further, the polymerization may involve comonomers that have a functional group such as for example a group capable of participating in a peroxide cure reaction. Such functional groups include halogens such as Br or I as well as nitrile groups. Specific examples of such comonomers that may be listed here include (a) bromo- or iodo-(per)fluoroalkyl-(per)fluorovinylethers having the formula:

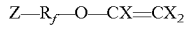
$$Z-R_f-O-CX=CX_2$$

wherein each X may be the same or different and represents H or F, Z is Br or I, $R_f$ is a (per)fluoroalkylene $C_1$-$C_{12}$, optionally containing chlorine and/or ether oxygen atoms; for example: $BrCF_2-O-CF=CF_2$, $BrCF_2CF_2-O-CF=CF_2$, $BrCF_2CF_2CF_2-O-CF=CF_2$, $CF_3CFBrCF_2-O-CF=CF_2$, and the like; and (b) bromo- or iodo containing fluoroolefins such as those having the formula:

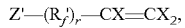
$$Z'-(R_f')_r-CX=CX_2,$$

wherein each X independently represents H or F, Z' is Br or I, $R_f'$ is a perfluoroalkylene $C_1$-$C_{12}$, optionally containing chlorine atoms and r is 0 or 1; for instance: bromotrifluoroethylene, 4-bromo-perfluorobutene-1, and the like; or bromofluoroolefins such as 1-bromo-2,2-difluoroethylene and 4-bromo-3,3,4,4-tetrafluorobutene-1.

Examples of nitrile containing monomers that may be used include those that correspond to one of the following formulas:

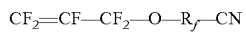
$$CF_2=CF-CF_2-O-R_f-CN$$

$$CF_2=CFO(CF_2)_wCN$$

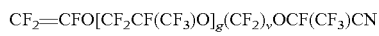
$$CF_2=CFO[CF_2CF(CF_3)O]_g(CF_2)_vOCF(CF_3)CN$$

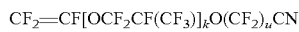
$$CF_2=CF[OCF_2CF(CF_3)]_kO(CF_2)_uCN$$

wherein w represents an integer of 2 to 12; g represents an integer of 0 to 4; k represents 1 or 2; v represents an integer of 0 to 6; u represents an integer of 1 to 6, $R_f$ is a perfluoroalkylene or a bivalent perfluoroether group. Specific examples of nitrile containing liquid fluorinated monomers include perfluoro(8-cyano-5-methyl-3,6-dioxa-1-octene), $CF_2=CFO(CF_2)_5CN$, and $CF_2=CFO(CF_2)_3OCF(CF_3)CN$.

Examples of fluoropolymers of the fluoropolymer dispersion include PTFE, modified PTFE, micro-powder, a copolymer of vinylidene fluoride and hexafluoropropylene, a copolymer of tetrafluoroethylene and vinylidene fluoride, a copolymer of tetrafluoroethylene and propylene, a copolymer of tetrafluoroethylene and perfluorovinyl ether, a copolymer of vinylidene fluoride and perfluorovinyl ether, a copolymer of tetrafluoroethylene, ethylene or propylene and perfluorovinyl ether, a copolymer of tetrafluoroethylene, hexafluoropropylene and perfluorovinylether, a copolymer of tetrafluoroethylene, vinylidene fluoride and hexafluoropropylene and optionally chlorotrifluoroethylene (CTFE), a copolymer of vinylidene fluoride, tetrafluoroethylene and perfluorovinyl ether and a copolymer of tetrafluoroethylene, ethylene or propylene, hexafluoropropylene and perfluorovinyl ether. Further examples of fluoropolymers include copolymers of tetrafluoroethylene which can be processed from the melt, especially those of tetrafluoroethylene/hexafluoropropylene, tetrafluoroethylene/perfluoro(alkylvinyl)ethers with perfluoroalkyl radicals having 1 to 5 C atoms, in particular perfluoro (n-propyl-vinyl)ethers, tetrafluoroethylene/ethylene, tetrafluoroethylene/trifluorochloroethylene, trifluorochloroethylene/ethylene, tetrafluoroethylene/vinylidene fluoride and hexafluoropropylene/vinylidene fluoride, and terpolymers of tetrafluoroethylene/perfluoro(alkylvinyl)ether/hexafluoropropylene, tetrafluoroethylene/ethylene/hexafluoropropylene and tetrafluoroethylene/vinylidene fluoride/hexafluoropropylene, or of quaternary polymers of tetrafluoroethylene/vinylidene fluoride/hexafluoropropylene/perfluoro(alkylvinyl)ethers and tetrafluoroethylene/ethylene/hexafluoropropylene/perfluoro (alkylvinyl)ethers. Further fluoropolymers that can be used in the dispersion include polyvinyl fluoride, polyvinylidene fluoride and polytrifluorochloroethylene.

The particle size of the fluoropolymer in the aqueous fluoropolymer dispersion is typically between 40 nm and 400 nm as such particle sizes (Z average particle diameter) typically result from an emulsion polymerization. Smaller particle sizes are contemplated as well, for example between 30 nm and 60 nm, which are typically obtained with microemulsion polymerization. Generally, after polymerization the particles will be spherical but rod shaped particles may be obtained as well and/or may be present in admixture with spherical particles.

In a particular embodiment in connection with this invention, a mixture of fluoropolymer particles is used that have a distinct average particle size such that the mixture has a bimodal or multi-modal distribution in particle size. For example, in one embodiment, a mixture of fluoropolymer particles having an average particle size of not more than 100 nm, for example between 30 and 90 nm or between 50 and 80 nm, is mixed with fluoropolymer particles having an average particle size of at least 180 nm, for example 190 nm to 400 nm or 200 nm to 350 nm. The fluoropolymer particles having distinct average particle sizes may be of the same or similar chemical composition or they can be different. For example, in one embodiment the mixture may comprise non-melt processible fluoropolymer particles of distinct average particle diameter. In another embodiment, a mixture of a melt-processible and non-melt processible fluoropolymer or of two melt processible fluoropolymers with different particle sizes may be used.

In a particular embodiment in connection with the present invention, there is provided an aqueous fluoropolymer dispersion comprising (i) fluoropolymer particles in an amount of 30 to 70% by weight, (ii) fluorinated surfactant in an amount of more than 0 ppm but not more than 500 ppm, or not more than 250 ppm or not more than 100 ppm, (iii) one or more non-ionic non-fluorinated surfactants and (iv) one or more anionic non-fluorinated surfactants, whereby the fluorinated surfactant comprises one or more fluorinated carboxylic acids or salts thereof having the general formula (I) defined above.

Dispersions according to this embodiment may provide in particular the advantage of improved stability and generally have desirable viscosity properties which is an advantage in coating applications, in particular, such dispersion will generally have a constant viscosity over a certain temperature range. In a particular aspect of this embodiment, the fluoropolymer is selected from homo- or copolymers of tetrafluoroethylene (TFE) including such polymers of TFE that are melt processable or not. In a preferred aspect of this embodiment, the non-ionic non-fluorinated surfactants do not comprise aromatic group containing surfactants. Also, the anionic surfactant in this embodiment is preferably a carboxylic fatty acid such as lauric acid. Typically the amount of non-ionic non-fluorinated surfactant in the dispersion is between 1 and 15% by weight (based on solids in the dispersion) and the amount of anionic non-fluorinated surfactant is typically between 10 ppm and 5000 ppm, preferably between 100 ppm and 3000 ppm, more preferably between 100 ppm and 2500 ppm based on the weight of the fluoropolymer solids in the dispersion.

The dispersions prepared in accordance with the present invention may be used in any application in which aqueous fluoropolymer dispersions are typically used. Such applications include in particular the coating of substrates such as metal substrates including aluminium substrates and stainless steel for cook and bakeware and technical applications and glass fabrics as well as impregnation applications. The dispersion may also be used in polymer additive applications.

EXAMPLES

Test Method

Content of Fluorinated Carboxylic Acid

The amount of fluorinated carboxylic acid in aqueous solution was determined by conversion of the fluorinated emulsifier into the methyl ester followed by an analysis with gas chromatography (head space) using methyl ester of perfluorodecanoic acid as an internal standard. The detection limit was about 10 ppm.

Particle Size

The latex particle size determination was conducted by means of dynamic light scattering with a Malvern Zetazizer 1000 HAS in accordance to ISO/DIS 13321. Prior to the measurements, the polymer lattices as yielded from the polymerizations were diluted with 0.001 mol/L KCl-solution, the measurement temperature was 25° C. in all cases. The reported average is the Z-average particle diameter.

SSG: Standard specific gravity was measured according ASTM 4894-04

Solid Content for raw dispersions: Determination of solid content was done by subjecting the latex sample to a temperature up to 250° C. for 30 min.

Solid Content for concentrated dispersions: Determination of solid content was done according to ISO 12086 (2 h 120° C., 35 min 380° C.).

Polymerization of Fluorinated Monomers (Fluoroolefin) Using a Fluorinated Carboxylic Acid The polymerization experiments were performed in a 40 l kettle equipped with an impeller agitator and a baffle. The kettle was charged with 30 l of deionized water and set to 35° C.; the kettle was evacuated repeatedly to remove oxygen; Agitation speed was set to 165 rpm. The oxygen free kettle was charged with 70 mmol fluorinated emulsifier (unless specified differently) as listed in table 3 and the following materials were added: 0.5 ml of a solution containing 40 mg of copper sulphate penta hydrate and 1 mg of conc. sulphuric acid; 15 g of a 25 w-% of aqueous ammonia solution and 5.6 g of $CF_3CF_2CF_2$—O—$CF(CF_3)$—$CF_2$—O—$CF=CF_2$ (PPVE-2). Finally the reactor was pressurized with tetrafluoroethylene (TFE) to 0.2 MPa and 47 g of hexafluoropropylene (HFP) were added. The kettle was then set to 1.5 MPa using TFE and 100 ml of an aqueous initiator solution containing 140 mg of sodium disulfite followed by 100 ml of a solution containing 340 mg of ammonium peroxodisulfate was pumped into the reactor. The beginning of the polymerization is indicated by a pressure drop. During polymerization the pressure was maintained at 1.5 MPa by feeding TFE continuously. After 3.2 kg of TFE had been added, the monomer valve was closed and the pressure was released. The characteristics of the obtained polymer lattices are summarized in table 3.

1000 ml of this polymer dispersion were coagulated by adding 20 ml hydrochloric acid under agitation. The coagulated material was agglomerated with gasoline and washed repeatedly. The agglomerated polymer was dried overnight at 200° C. in a vacuum oven; test data are given in table 3.

TABLE 1

| Emulsifiers used: | |
|---|---|
| $C_7F_{15}COONH_4$ | Comparative example C-1 |
| $CF_3$—O—$(CF_2)_3$—O—CF(CF$_3$)—$COONH_4$ | Comparative example C-2 |
| $C_3F_7$—O—CF(CF$_3$)—$CF_2$—O—$CF_2$—$COONH_4$ | Comparative example C-3 |
| $CF_3$—O—$(CF_2)_3$—O—$CF_2$—$COONH_4$ | Compound 1 |
| $CF_3$—$OCF_2$—O—$CF_2$—$COONH_4$ | Compound 2 |
| $CF_3$—$OCF_2$—$OCF_2$—$OCF_2$—$COONH_4$ | Compound 3 |
| $CF_3$—$(OCF_2)_3$—$OCF_2$—$COONH_4$ | Compound 4 |
| $C_3F_7$—O—$CF_2$—$COONH_4$ | Compound 5 |
| $CF_3$—O—$CF_2$—$CF_2$—$COONH_4$ | Compound 6 |
| $C_2F_5$—O—$CF_2$—$CF_2$—$COONH_4$ | Compound 7 |
| $C_3F_7$—O—$CF_2$—$CF_2$—$COONH_4$ | Compound 8 |
| $C_4F_9$—O—$CF_2$—$CF_2$—$COONH_4$ | Compound 9 |
| $C_2F_5$—O—$CF_2$—$CF_2$—O—$CF_2$—$COONH_4$ | Compound 10 |
| $CF_3$—O—$CF_2$—$CF_2$—$CF_2$—O—CHF—$CF_2$—$COONH_4$ | Compound 11 |
| $CF_3$—O—$CF_2$—$CF_2$—$CF_2$—O—CHF—$COONH_4$ | Compound 12 |
| $C_3F_7$—O—CFH—$CF_2COONH_4$ | Compound 13 |
| $CF_3$—CFH—O—$(CF_2)_5$—$COONH_4$ | Compound 14 |
| $CF_3$—CFH—O—$(CF_2)_3$—$COONH_4$ | Compound 15 |
| $C_3F_7$—O—CFH—$CF_2$—O—$CH_2$—$COONH_4$ | Compound 16 |
| $C_3F_7$—O—CFH—$COONH_4$ | Compound 17 |

Preparation of Compound 1:
$CF_3OCF_2CF_2CF_2OCF_2COONH_4$

Oxidation of perfluorinated vinyl ethers with oxygen in the presence of $SbF_5$ was carried out as described in U.S. Pat. No. 4,987,254. The initially formed acid fluorides were esterified with methanol and purified by distillation. The distilled esters were converted to the corresponding ammonium salts by saponification with aqueous ammonia. A dry flask equipped with a magnetic stirrer bar, thermometer, dry ice reflux condenser, dropping funnel, and gas inlet tube was charged with 5 g of graphite. The flask was flushed with nitrogen and 332 g of $CF_3OCF_2CF_2CF_2OCF=CF_2$ were added at room temperature. 2.6 g of $SbF_5$ was added via the dropping funnel and oxygen was charged to the flask at ambient pressure. An exothermic reaction indicated the oxidation. Total reaction time was 14 h. After the first hour 2.6 g and after 7 hours 3.5 g of $SbF_5$ were added. Esterification was achieved by slow addition of 50 g of methanol to the reaction mixture. The resulting ester was isolated from the batch by flash distillation after addition of 300 g water and 50 g methanol. The distillate formed two phases. The lower phase was separated and the upper phase returned to the flask. 310 g of lower phase were collected. GC analysis showed a content of 52% of $CF_3OCF_2CF_2CF_2OCF_2COOCH_3$. Purification via fractionated distillation resulted in 144 pure ester with a boiling point of 51° C. at 52 mbar. $CF_3OCF_2CF_2COOCH_3$ was isolated as by product. Saponification of the ester with aqueous ammonia at 60-80° C. and removal of methanol by distillation resulted in an aqueous solution of $CF_3OCF_2CF_2CF_2OCF_2COONH_4$. All structures were confirmed by F-NMR spectra.

Preparation of Compound 5:
$CF_3CF_2CF_2OCF_2COONH_4$

Using the procedures described in U.S. Pat. No. 4,987,254, $CF_3CF_2CF_2OCF=CF_2$ was converted to $CF_3CF_2CF_2OCF_2COOCH_3$ (bp 102-104° C.). Saponification with aqueous ammonia and removal of methanol by distillation resulted in an aqueous solution of $CF_3CF_2CF_2OCF_2COONH_4$. Structures were confirmed by F-NMR spectra.

Preparation of Compound 17:
$CF_3CF_2CF_2OCHFCOONH_4$

A 2 liter glass flask equipped with a mechanical stirrer, thermometer and reflux condenser (−80° C.) is used. Heating of the flask is provided by an electric heating mantle. The conversion is carried out as a one pot reaction. 275 g perfluoropropyl vinyl ether (PPVE), 280 g KOH, 602 g water, 151 g t-butanol, and 10 g methyl trioctyl ammonium chloride are placed in the flask. The three phase mixture is subjected to vigorous stirring. After initial heating a moderate exothermic reaction occurs. Mixing is continued for nine hours. During this time the internal temperature adjusts to 27-33° C. Mixing is stopped when the exothermic reaction ceases. The reaction mixture forms two layers. The low temperature reflux condenser is replaced by a standard reflux condenser. Sulfuric acid (392 g) is slowly added without external cooling. The batch is heated to reflux. Unreacted PPVE is vented. At about 80° C. internal temperature gas begins to evolve. Heating is continued until the gas evolution has ceased. At this time the internal temperature reaches 101° C. The batch is cooled to RT and the reflux condenser is replaced by a distillation device. No column is used. 110 g methanol is added to the batch and distillation is started. The condensed vapors form two layers. The lower layer is separated and the upper layer is returned to the flask. Distillation is stopped when no more lower phase is formed. In total, 234 g of lower phase are collected. Fractionation of the lower phase yields 167 g of $C_3F_7OCHFCOOCH_3$ with a boiling point of 120-122° C. at ambient pressure. Calculated yield: 59% based on total PPVE used; 70% based on converted PPVE. The ester is converted to the ammonium salt by reaction with aqueous ammonia.

Methanol is removed by fractionated distillation. The resulting aqueous solution is used as an emulsifier in the polymerization of fluorinated olefins.

Preparation of Compound 12:
$CF_3OCF_2CF_2CF_2OCHFCOONH_4$

A glass flask equipped with a reflux condenser, thermometer, and magnetic stirrer was used. Perfluoromethoxy propyl vinyl ether (498 g), t-butanol (149 g), water (1007 g), potassium hydroxide (280 g), and methyl trioctyl ammonium chloride (10 g) were added to the flask. The resulting two phase mixture was heated to reflux for 16 hours under vigorous stirring. The mixture was cooled to room temperature and sulphuric acid (588 g) was added. The two phase mixture was heated again under vigorous stirring. At about 70° C. gas began to evolve. Heating was continued until the gas evolution ceased. The reflux condenser was replaced by a distillation device which allowed the separation of a lower phase while returning the upper phase to the flask. Methanol (150 g) was added and the mixture was heated for distillation. Distillation was carried out at ambient pressure without any intent for rectification. The condensed vapors separated into two phases. The lower phase was collected and the upper phase was returned to the flask. Distillation was continued until no more lower phase separated from the condensate. The combined crude ester (493 g) was purified by fractionated distillation, resulting in 401 g $CF_3O(CF_2)_3OCHFCOOCH_3$ with a boiling point of 51 to 52° C./22 mbar. This corresponds to a yield of 78%, based on vinyl ether used. The ester was converted to the ammonium salt by heating with aqueous ammonia and removal of methanol by fractionated distillation.

Alternatively, the previous reaction was repeated but 36 g of an aqueous solution containing 11 g of $CF_3O(CF_2)_3OCHFCOONH_4$ was used as phase transfer catalyst instead of methyl trioctyl ammonium chloride. The mixture was slowly heated to 70° C. internal temperature. Total reaction time was 26 hours. Work up was carried out as described above. 438 g of distilled $CF_3O(CF_2)_3OCHFCOOCH_3$ was received. This corresponds to a yield of 83% (calculation includes the amount of phase transfer catalyst).

The conversion to the ammonium salt was carried out as above.

Preparation of Compound 13:
$C_3F_7OCHFCF_2COONH_4$ a. Preparation of $CF_3CF_2CF_2OCHFCF_2CH_2OH$ In a 2 liter glass flask equipped with a stirrer, thermometer, reflux condenser, and dropping funnel were placed 1008 g methanol, 266 g perfluoropropyl vinyl ether, and 9.2 g of Rongalit® (sodium hydroxymethyl sulfinate). The reaction mixture was heated to reflux, resulting in an internal temperature of 29° C. 7.1 g t-butyl hydroperoxide (70% in water) is added in aliquots during a 9 h time frame. The internal temperature reached 52° C. at the end. The reaction mixture showed a single liquid phase and some solids. The liquid was analyzed by GC and indicated a content of 223 g of $C_3F_7OCHFCF_2CH_2OH$ which corresponded to a yield of 75%.

Distillation of the reaction mixture resulted in 171 g of product (bp 54° C./23 mbar) corresponding to an isolated yield of 57%.

b. Preparation of $C_3F_7OCHFCF_2COONH_4$

A 2 liter glass flask equipped with a thermometer, reflux condenser, dropping funnel and stirrer was used. 674 g water, 136 g $KMnO_4$, and 38 g NaOH are placed in the flask. 169 g $C_3F_7OCHFCF_2CH_2OH$ were added to the well stirred mixture via the dropping funnel. The temperature is held below 50° C. Residual permanganate was destroyed by addition of a small amount of methanol. The resulting slurry was filtered to remove the $MnO_2$. After washing the filter cake with water, the combined filtrate was transferred to a distillation apparatus and acidified with 65 g of sulfuric acid. 100 g methanol was added and a flash distillation was started. The distillate formed two layers. The lower layer was separated and the upper layer returned to the distillation pot. In total 182 g lower layer were collected. Fractionation of the crude ester resulted in 137 g of $C_3F_7OCHFCF_2COOCH_3$ with a boiling point of 55-56° C./52 mbar. This corresponds to a yield of 77%.

The ester was converted to the ammonium salt by saponification with aqueous ammonia and subsequent removal of methanol by distillation.

Preparation of Compound 11:
$CF_3O(CF_2)_3OCHFCF_2COONH_4$ a. Preparation of $CF_3O(CF_2)_3OCHFCF_2CH_2OH$ Using equipment similar to the described above, 255 g of perfluoromethoxypropyl vinyl ether and 730 g methanol were converted with Rongalit and t-butylhydroperoxide as radical source. Reaction temperature started at 47° C. and reached 64° C. at the end. Work up by distillation yielded 166 g of pure $CF_3O(CF_2)_3OCHFCF_2CH_2OH$ with a boiling point of 60-61° C./20 mbar. This corresponds to a yield of 59%.

b. Preparation of $CF_3O(CF_2)_3OCHFCF_2COONH_4$

A 2 liter glass flask equipped with a thermometer, reflux condenser, dropping funnel and stirrer was used. 159 g of $CF_3O(CF_2)_3OCHFCF_2CH_2OH$, 520 g water, and 100 g sulfuric acid were added to the flask. 190 g KMnO4 were added manually to the liquid over a period of 2 hours while stirring. The reaction temperature increased to 95° C. over time. After a post reaction time of two hours, an aqueous solution of sodium bisulfite was added until a clear solution was formed. 100 g of methanol and in total 400 g of 50% aqueous sulphuric acid were added. Flash distillation of the reaction mixture resulted in a two phase distillate. Fractionation of the lower phase (120 g) gave 85.5 g of $CF_3O(CF_2)_3OCHFCF_2COOCH_3$ (bp 34-35° C./6 mbar; yield 50%).

The ester was converted to the ammonium salt by saponification with aqueous ammonia and subsequent removal of methanol by distillation.

Preparation of Compound 6

$CH_3—O—CF_2—CF_2—COOCH_3$ was fluorinated as described in WO 01/46116; the acid fluoride $CF_3—O—CF_2—CF_2—COF$ was then converted into the methylester. The distilled ester was converted into the ammonia-salt as described above.

Preparation of Compound 14:
$CF_3—CFH—O—(CF_2)_5COONH_4$

A sample of diacid fluoride, $FCOCF(CF_3)—O—(CF_2)_5COF$ (500 g, 1.1 mol) prepared from the hexafluoropropylene oxide (HFPO) coupling of perfluoroadipoyl fluoride as described in U.S. Pub. No. US 2004/0116742 and was added over 2 hours to a stirred slurry of sodium carbonate (500 g, 4.7 mol) in 500 g of diglyme at 85° C. to make the disalt. The reaction liberated $CO_2$ gas. Distilled water (25 g, 1.4 mol) was added at 85° C. The mixture was heated up to 168° C. with $CO_2$ off-gassing and held for 30 minutes. Reaction was cooled down and sulphuric acid (350 g, 3.6 mol) in 1100 g of water was added to make the reaction mixture acidic. Bottom phase was washed with 400 g of 50% sulfuric acid and vacuum distilled to give $CF_3—CFH—O—(CF_2)_5COOH$ 426 g, 1.0 mol for a 95% yield having a boiling point of 132-135° C./15 mm. This was followed by the addition of 46 g NaOH in 63 g of water. Dried salts in vacuum oven at 112° C./15 mm Hg to give 386 g of slight yellow sticky solids. To the salt was added sulphuric acid and the lower fluorochemical phase was vacuum distilled. The previous process was repeated two more times to yield a colorless acid. The surfactant $CF_3—CFH—O—(CF_2)_5COONH_4$ having a melting point of 159-165° C. was made quantitatively from the reaction of 200 g of acid reacted with excess ammonium hydroxide and dried.

Preparation of Compound 15:
$CF_3—CFH—O(CF_2)_3COONH_4$

A sample of diacid fluoride, $FCOCF(CF_3)—O—(CF_2)_3COF$ (503 g, 1.4 mol) prepared from the HFPO coupling of perfluorosuccinyl fluoride as described in US Pub. No. 2004/0116742 and was added over 2 hours to a stirred slurry of sodium carbonate (387 g, 3.7 mol) in 650 g of diglyme at 78° C. to make the disalt. The reaction liberated $CO_2$ gas. Distilled water (35 g, 1.9 mol) was added at 85° C. The mixture was heated up to 165° C. with $CO_2$ off-gassing and held for 30 minutes. Reaction was cooled down and sulphuric acid (250 g, 2.6 mol) in 1250 g of water was added to make the reaction mixture acidic. To the bottom phase was added 60 g NaOH in 60 g of water. Dried the salt in vacuum oven at 112° C./15 mm and recovered 450 g. To the salt was added 300 g of 50% sulphuric acid and the lower fluorochemical phase was washed once with 200 g of 50% sulphuric acid. Vacuum distillation gave $CF_3—CFH—O—(CF_2)_3COOH$ (400 g, 1.3 mol) for a 95% yield having a boiling point of 111° C./15 mm Hg. The acid was treated with caustic followed by sulphuric acid and vacuum distilled. This was repeated a second time to yield a colorless acid. The surfactant $CF_3—CFH—O—(CF_2)_3COONH_4$ having a melting point of 64-68° C. was made quantitatively from the reaction of 208 g of acid reacted with excess ammonium hydroxide and dried.

Preparation of Compound C-3: $C_3F_7—O—CF(CF_3)—CF_2—O—CF_2—COONH_4$

Conversion of $CF_3CF_2CF_2OCF(CF_3)CF_2OCF=CF_2$ to $CF_3CF_2CF_2OCF(CF_3)CF_2OCF_2COOCH_3$ (bp 91-92° C. at 133 mbar) was carried out as described in U.S. Pat. No. 4,987,254. The ester was reacted with aqueous ammonia and methanol was removed by distillation resulting in $CF_3CF_2CF_2OCF(CF_3)CF_2OCF_2COONH_4$. All structures were confirmed by F-NMR spectra. Due to an isomer content in the vinyl ether, an isomer with the structure $CF_3CF_2CF_2OCF_2CF(CF_3)OCF_2COOX$ (X=$CH_3$, $NH_4$) was found.

Preparation of Compound 16:
$C_3F_7—O—C_2HF_3—O—CH_2—COONH_4$

A mixture of 320 ml Tetrahydrofurane, 40 g Hydroxy acetic methylester and 188 g PPVE is cooled to 0° C., 27 g KOH-powder are added in small portions—during the addition of KOH, the reaction mixture heats up to 60° C. After the addition of KOH, the whole reaction mixture is agitated for 6 h at 25° C. The precipitated salt is separated by filtration, dissolved in 300 ml water and then treated with 57 g $H_2SO_4$ (conc). The resulting mixture separates in two layers; the lower phase is $C_3F_7—O—C_2HF_3—O—CH_2—COOH$, 86 g (56%). The distilled acid (bp. 125° C., 20 mbar) is neutralized with 25% aqueous ammonia solution to provide a 30% solution in water.

Compounds 2, 3, 4 were prepared from the corresponding carboxylic acids (purchased from Anles Ltd. St. Petersburg, Russia) by neutralizing with aqueous ammonia.

Compounds 7, 8, 10 were prepared from the corresponding carboxylic acid fluorides (—COF) [purchased from Exfluor, Round Rock, Tex., USA]. The acid fluorides were converted by addition of methanol to the methylester. The distillated methylester were saponified with aqueous ammonia at 60-80° C. and methanol is removed by distillation. Compound C-2 was prepared as described in U.S. Pat. No. 6,703,520 (column 7).

Determination of Bio-Accumulation

The perfluorinated and partially fluorinated carboxylates were evaluated for urinary clearance using a pharmacokinetic study in rats. The goal was to measure the total amount of parent compound eliminated via urinary output and estimate the rate of elimination. The study was approved by the IACUC (Institutional Animal Care and Use Committees) and was performed in 3M Company's AAALAC (Association for Assessment and Accreditation of Laboratory Animal Care)-accredited facility.

The study utilized male Sprague Dawley rats, 6 to 8 weeks of age, and approximately 200 to 250 g body weight at study onset. The test compounds of table 2 were administered at a dose of 73 micro Moles per kg body weight in rats (N=3 animals per tested compound). All test compounds were prepared in sterile deionized water and given to rats via oral gavage. After test compounds administration, the rats were housed individually in metabolism cages for urine collection: 0 to 6 hours, 6 to 24 hours, 24 to 48 hours and 72 to 96 hours. Animals were observed throughout the study for clinical signs of toxicity. Gross necropsy was performed at the termination of each study (96 hours post-dose) with sera and liver samples being retained from each animal.

The concentration of the parent compound or metabolites thereof were quantitatively measured via fluorine NMR on each urine sample for each animal at each time point based on internally added standards.

The bioaccumulation data obtained in accordance with the above test are reported in table 2 below.

TABLE 2

|  | T ½ (h) | % Recovery (96 h) | Compound-related Effects |
|---|---|---|---|
| C-1 | ~550 | 6 | Hepatomegaly |
| C-2 | 29 | 40 | Hepatomegaly |
| C-3 | 95 | 5 | Hepatomegaly |
| Compound 1 | 10 | 73 | — |
| Compound 2 | 12 | 96 | — |
| Compound 3 | 12 | 100 | — |
| Compound 4 | 15 | 50 | — |
| Compound 5 | 11 | 97 | — |
| Compound 6 | 11 | 100 | — |
| Compound 7 | 10 | 100 | — |
| Compound 8 | 12 | 82 | — |
| Compound 9 | 31 | 42 | Hepatomegaly |
| Compound 10 | 10 | 99 | — |
| Compound 11 | 12 | 84 | — |
| Compound 12 | 11 | 95 | |
| Compound 13 | 11 | 94 | — |
| Compound 14 | 24 | 32 | Hepatomegaly |
| Compound 15 | 8 | 95 | — |
| Compound 16 | 13* | 65* | — |

*No parent compound observed in the urine. T ½ and % recovery are based on elimination of the major metabolite—$C_3F_7$—O—CHFCOO$^-$. $T_{1/2}$ is the time required for the amount of a particular substance in a biological system to be reduced by one half by biological processes when the rate of removal is approximately exponential. In these examples the value of $T_{1/2}$ is calculated by exponential least squares curve fitting (y = $Ae^{Bx}$ and $T_{1/2}$ = 0.693/B) where y represents the concentration of analyte in urine and x represents time in hours.

TABLE 3

|  | C-1 | C-2 | C-3 | 1 | 2 (140 mmol) | 3 | 4 | 5 | 6 |
|---|---|---|---|---|---|---|---|---|---|
| Polymerization time (min) | 101 | 77 | 87 | 74 | 109 | 69 | 82 | 73 | 84 |
| Average Particle Size (nm) | 111 | 118 | 113 | 110 | 129 | 115 | 109 | 122 | 122 |
| SSG (g/cm$^3$) | 2.166 | 2.165 | 2.149 | 2.169 | 2.157 | 2.165 | 2.163 | 2.169 | 2.175 |
| Solid content (w-%) | 9.9 | 10.0 | 10.3 | 10.3 | 9.7 | 10.1 | 10.2 | 10.0 | 7.1 |

|  | 7 (140 mmol) | 8 | 9 | 10 | 11 | 12 | 13 | 14 (140 mmol) | 15 |
|---|---|---|---|---|---|---|---|---|---|
| Polymerization time (min) | 73 | 79 | 72 | 72 | 82 | 82 | 83 | 75 | 78 |
| Average Particle Size (nm) | 129 | 115 | 113 | 102 | 126 | 108 | 128 | 127 | 105 |
| SSG (g/cm$^3$) | 2.159 | 2.167 | 2.165 | 2.166 | 2.168 | 2.167 | 2.164 | 2.151 | 2.154 |
| Solid content (w-%) | 10.1 | 10.0 | 10.2 | 10.1 | 10.2 | 10.3 | 10.2 | 8.1 | 10. |

Example 1

A PTFE-Dispersion was Prepared According to the Following Polymerization Process The polymerization was performed in a 40 l kettle equipped with an impeller agitator and a baffle. The kettle was charged with 30 l of deionized water and set to 35° C.; the kettle was evacuated repeatedly to remove oxygen; Agitation speed was set to 165 rpm. The oxygen free kettle was charged with 70 mmol of ammonium 2,4,6 trioxa-perfluoro-octanoate (called in the following "fluorinated emulsifier") ($CF_3$—($OCF_2$)$_3$—$COONH_4$) and the following materials were added: 0.5 ml of a solution containing 40 mg of copper sulphate penta hydrate and 1 mg of conc. sulphuric acid; 15 g of a 25 w-% of aqueous ammonia solution and 5.6 g of $CF_3CF_2CF_2OCF(CF_3)$—$CF_2$—O—$CF$=$CF_2$ (PPVE-2). Finally the reactor was pressurized with tetrafluoroethylene (TFE) to 0.2 MPa and 47 g of hexafluoropropylene (HFP) were added. The kettle was then set to 1.5 MPa using TFE and 100 ml of an aqueous initiator solution containing 140 mg of sodium disulfite followed by 100 ml of a solution containing 340 mg of ammonium peroxodisulfate was pumped into the reactor. The beginning of the polymerization is indicated by a pressure drop. During polymerization the pressure was maintained at 1.5 MPa by feeding TFE continuously. After 3.2 kg of TFE had been added, the monomer valve was closed and the pressure was released.

The so obtained polymer dispersion had a solid content of 10.1 wt-% and a pH of 9.6. The latex particle diameter was 115 nm according to dynamic light scattering. Before removing the fluorinated emulsifier by an ion exchange process, 8% (based on solids content) of Genapol X 080 (non-ionic emulsifier) were added to the dispersion. The fluorinated emulsifier was measured to be 700 ppm before ion exchange.

A commercially available strong basic ion exchange resin Amberlite IRA402 Cl (capacity 1.3 mol/l) was used to remove the fluorinated emulsifier. The column was filled with 300 ml anion exchange resin and brought into OH-form by passing 12 bed volumes (BV) (1BV is equal to 300 ml) of NaOH (4% in water) through the column (flow rate 3 BV/h). The resin was washed with 10 BV deionized water and 3 BV of Genapol X 080 (1% in water). The Dispersion was then passed through the ion exchange column from bottom to top. Flow rate varied between 0.5 to 1.5 BV/h.

After different amounts of dispersion had passed through the ion exchange column (see table 4) a sample was taken and the residual fluorinated emulsifier content was measured. No clogging of the column was observed. The solid content of the dispersion and the average particle size of the latex after removal of fluorinated emulsifier remained unchanged. The pH of the dispersion after ion exchange was about 10.6.

TABLE 4

| Sample | Amount of Dispersion passed through column (BV) | Residual Fluorinated Emulsifier content in Disperison (ppm) |
|---|---|---|
| 1 | 5 | <10 ppm |
| 2 | 17 | <10 ppm |
| 3 | 35 | <10 ppm |
| 4 | 62 | <10 ppm |

Example 2

A PTFE dispersion with a solid content of 21 wt-% and a particle size of 220 nm containing about 900 ppm of the fluorinated emulsifier ammonium 2,4,6,8 tetraoxa-perfluoro-decanoate ($CF_3$—($OCF_2$)$_4$—$COONH_4$) was ion exchanged in the presence of 5% of Triton™ X 100 (based on solids content). The pH of the dispersion before ion exchange was pH=8.8 and after ion exchange about 10.5. The ion exchange resin was prepared according to Example 1, except for washing the resin with Triton™ X 100 (1% in water) instead of Genapol™ X 080. The residual fluorinated emulsifier content is given in table 5. The solid content of the dispersion and the average particle size of the latex after removal of fluorinated emulsifier remained unchanged. No clogging of the column was observed.

TABLE 5

| Sample | Amount of Dispersion passed through column (BV) | Residual Fluorinated Emulsifier content in Disperison (ppm) |
|---|---|---|
| 1 | 6 | <10 ppm |
| 2 | 12 | <10 ppm |
| 3 | 19 | <10 ppm |
| 4 | 25 | <10 ppm |

After ion exchange the dispersion was thermally up concentrated to a solid content of 58%. Prior to up-concentration, 1000 ppm of anionic surfactant Hostapur™ SAS 30 was added.

What is claimed is:

1. Method comprising:
   (i) providing a fluoropolymer dispersion comprising fluoropolymer particles and one or more fluorinated surfactants selected from fluorinated carboxylic acids or salts thereof having the general formula:

$$[R_f\text{—O-L-COO}^-]_i X^{i+} \quad (I)$$

wherein L represents a linear fully fluorinated alkylene group, $R_f$ represents a linear fully fluorinated aliphatic group or a linear fully fluorinated aliphatic group interrupted with one or two oxygen atoms, $X^{i+}$ represents a cation having the valence i and i is 1, 2 or 3, wherein the fluorinated carboxylic acids or salts thereof have no more than 3 carbon atoms sequentially bonded;
   (ii) adding one or more non-fluorinated surfactants selected from anionic and non-ionic surfactants; and
   (iii) reducing the total amount of said one or more fluorinated surfactants to an amount of not more than 500 ppm based on the total weight of the dispersion while maintaining or increasing the amount of solids in the dispersion.

2. Method according to claim 1 wherein said one or more non-fluorinated surfactants consist of non-ionic surfactants and wherein the amount of said fluorinated surfactants is reduced by contacting the fluoropolymer dispersion with an anion-exchange resin.

3. Method according to claim 1 wherein the amount of said fluorinated surfactants is reduced by ultrafiltration or by steam distilling the fluorinated surfactant in its free acid form.

4. Method according to claim 1 wherein said fluoropolymer dispersion comprises non-melt processible tetrafluoroethylene homo- or copolymer.

5. Method according to claim 1 wherein the method further comprises concentrating the fluoropolymer dispersion.

6. Method according to claim 1 wherein at least one non-ionic and at least one anionic non-fluorinated surfactant are added to the dispersion, at least one of said non-ionic and anionic non-fluorinated surfactant being added to the dispersion prior to reducing the amount of fluorinated surfactant in the dispersion.

7. Method according to claim 1 wherein said non-ionic non-fluorinated surfactants are selected from non-aromatic surfactants.

8. Method according to claim 1 wherein said non-ionic non-fluorinated surfactants are selected from surfactants of the general formula:

$$R^1—O—[CH_2CH_2O]_n—[R^2O]_m—R^3 \quad (XV)$$

wherein $R^1$ represents an aromatic or aliphatic hydrocarbon group having at least 8 carbon atoms, $R^2$ represents an alkylene having 3 carbon atoms, $R^3$ represents hydrogen or a $C_1$-$C_3$ alkyl group, n has a value of 0 to 40, m has a value of 0 to 40 and the sum of n+m being at least 2.

9. Method according to claim 1 wherein said anionic non-fluorinated surfactant is selected from surfactants having a carboxylic acid group or salt thereof and an aromatic or aliphatic hydrocarbon group.

10. A method according to claim 1 wherein the anion of said fluorinated carboxylic acids or salts thereof have a molecular weight of not more than 1000 g/mol.

11. A method according to claim 1 wherein the anion of said fluorinated carboxylic acids or salts thereof have a molecular weight of not more than 500 g/mol.

12. A method according to claim 1 wherein the fluorinated carboxylic acid or salt thereof when administered to rat shows a renal recovery rate of at least 50% of the administered amount, 96 hours after administration and wherein the renal half-life ($T_{1/2}$) is not more than 30 hours.

13. A method according to claim 1 wherein the fluorinated carboxylic acid or salts are selected from fluorinated carboxylic acid or salts of which any fluorinated aliphatic portion has not more than 3 carbon atoms.

14. A method according to claim 1 wherein L in said formula (I) is selected from the group consisting of linear perfluorinated alkylene groups having 1 to 3 carbon atoms.

15. A method according to claim 1 wherein $R_f$ is selected from the group consisting of linear perfluorinated aliphatic groups having 1 to 3 carbon atoms or linear perfluorinated aliphatic groups interrupted with one or two oxygen atoms of which alkylene groups between oxygen atoms have not more than 3-carbon atoms and wherein the terminal alkyl group has not more than 3 carbon atoms.

16. A method according to claim 1 wherein L is selected from the group consisting of —$(CF_2)_g$— wherein g is 1, 2, or 3.

17. A method according to claim 1 wherein $R_f$ corresponds to one of the following formulas:

(i) $R_f^1$—$[OR_f^2]_p$—$[OR_f^3]_q$—  (II)

wherein $R_f^1$ is a perfluorinated linear aliphatic group of 1 to 3 carbon atoms, $R_f^2$ and $R_f^3$ each independently represents a linear perfluorinated alkylene of 1, 2, or 3 carbon atoms and p and q each independently represent a value of 0 to 1 and wherein the sum of p and q is at least 1;

(iii) $R_f^8$—$(OCF_2)_a$—  (IV)

wherein a is 1 and $R_f^8$ is a linear fully fluorinated aliphatic group having 1, 2, or 3 carbon atoms; and (iv) $R_f^9$—O—$(CF_2)_b$—  (V)

wherein b is an integer of 1 to 3, and $R_f^9$ is a linear fully fluorinated aliphatic group having 1, 2, or 3 carbon atoms.

18. A method according to claim 1 wherein the fluorinated carboxylic acid corresponds to one of the following formulas:

(i) $R_f^c$—$(OCF_2)_u$—O—$(CF_2)_v$-AC  (VIII)

wherein u is 1, v is an integer of 1 to 3, $R_f^c$ represents a linear perfluorinated aliphatic group of 1, 2, or 3 carbon atoms and AC represents a carboxylic acid group or salt thereof; and (ii) $R_f^c$—O—$(CF_2)_y$—O-$L^1$-AC  (IX)

wherein y has a value of 1, 2, or 3, $L^1$ represents a linear perfluorinated alkylene of 1, 2, or 3 carbon atoms, $R_f^c$ is as defined in above formula (VIII) and AC represents a carboxylic acid group or salt thereof.

19. A method according to claim 1 wherein the fluorinated carboxylic acid or salt thereof is selected from the group consisting of $CF_3$—O—$CF_2$—$CF_2$—COOH
$C_2F_5$—O—$CF_2$—$CF_2$—COOH
$C_3F_7$—O—$CF_2$—$CF_2$—COOH
$CF_3$—(O—$CF_2$)$_2$—O—$CF_2$—COOH
$CF_3$—(O—$CF_2$)$_1$—O—$CF_2$—COOH
$CF_3$—(O—$CF_2$—$CF_2$)$_1$—O—$CF_2$—COOH
$C_2F_5$—(O—$CF_2$—$CF_2$)$_1$—O—$CF_2$—COOH
$C_2F_5$—(O—$CF_2$—$CF_2$)$_2$—O—$CF_2$—COOH
$CF_3$—(O—$CF_2$—$CF_2$)$_2$—O—$CF_2$—COOH
$C_3F_7$—O—$CF_2$—COOH
$CF_3$—O—$CF_2$—$CF_2$—$CF_2$—O—$CF_2$—COOH
$CF_3$—$CF_2$—O—$(CF_2)_3$COOH
$CF_3$—$CF_2$—O—$(CF_2)_5$COOH and salts of any of these fluorinated carboxylic acids.

20. A method according to claim 1 wherein the total amount of said one or more fluorinated surfactants is reduced to an amount of not more than 250 ppm.

* * * * *

UNITED STATES PATENT AND TRADEMARK OFFICE
CERTIFICATE OF CORRECTION

PATENT NO. : 8,614,265 B2
APPLICATION NO. : 13/494260
DATED : December 24, 2013
INVENTOR(S) : Klaus Hintzer It is certified that error appears in the above-identified patent and that said Letters Patent is hereby corrected as shown below:

On Title Page 3, in Column 2, References Cited under "(Other Publications)"
Line 5, delete "Emulusion" and insert -- Emulsion --, therefor.
Line 8, delete "Perfluroporpoxyethylene" and insert -- Perfluoropropoxyethylene --, therefor.
Line 29, delete "Perfluorvinyl" and insert -- Perfluorovinyl --, therefor.

In the Specification

Column 4
Line 46, delete "$R_f^1$—$[OR_f^2]_p$-$[OR_f^3]_q$" and insert -- $R_f^1$-$[OR_f^2]_p$-$[OR_f^3]_q$- --, therefor.

Column 7
Line 25, delete "up to" and insert -- upto --, therefor.
Line 52, delete "up to" and insert -- upto --, therefor.

Column 10
Line 36, delete "$CF_3$—CHF—O— $(CF_2)_n$—COOH" and insert
 -- $CF_3$—CHF—O—$(CF_2)_o$—COOH --, therefor.
Line 40, delete "$CF_3$—$CF_2$—O— $(CF_2)_n$—COOH" and insert
 -- $CF_3$—$CF_2$—O—$(CF_2)_o$—COOH --, therefor.
Line 58, delete "lypophilic" and insert -- lipophilic --, therefor.

Column 12
Line 38, delete "(Laurie" and insert -- (Lauric --, therefor.

Column 17
Line 54, delete "Zetazizer" and insert -- Zetasizer --, therefor.
Line 56, delete "lattices" and insert -- latices --, therefor.

Signed and Sealed this
Twenty-fourth Day of June, 2014

Michelle K. Lee
*Deputy Director of the United States Patent and Trademark Office*

CERTIFICATE OF CORRECTION (continued)
U.S. Pat. No. 8,614,265 B2

Column 18
Line 24, delete "lattices" and insert -- latices --, therefor.

Column 22
Line 59, delete "Tetrahydrofurane," and insert -- Tetrahydrofuran, --, therefor.

Column 24, in (Table 2)
Line 24, after "95" insert -- — --.

Column 25
Line 51, delete "Disperison" and insert -- Dispersion --, therefor.

Column 26
Line 11, delete "Disperison" and insert -- Dispersion --, therefor.

In the Claims

Column 27
Line 38, in Claim 15, delete "3-carbon" and insert -- 3 carbon --, therefor.

Column 28
Line 4, in Claim 17, delete "(iii)" and insert -- (ii) --, therefor.
Line 9, in Claim 17, delete "(iv)" and insert -- (iii) --, therefor.